(12) United States Patent
Liang et al.

(10) Patent No.: US 11,733,455 B2
(45) Date of Patent: Aug. 22, 2023

(54) AMPLITUDE AND PHASE LIGHT MODULATOR BASED ON MINIATURE OPTICAL RESONATORS

(71) Applicant: THE TRUSTEES OF COLUMBIA UNIVERSITY IN THE CITY OF NEW YORK, New York, NY (US)

(72) Inventors: Guozhen Liang, Singapore (SG); Heqing Huang, Bronx, NY (US); Michal Lipson, New York, NY (US); Nanfang Yu, Fort Lee, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 506 days.

(21) Appl. No.: 16/838,714

(22) Filed: Apr. 2, 2020

(65) Prior Publication Data

US 2022/0308370 A1    Sep. 29, 2022

Related U.S. Application Data

(60) Provisional application No. 62/838,084, filed on Apr. 24, 2019, provisional application No. 62/828,261, filed on Apr. 2, 2019.

(51) Int. Cl.
| | |
|---|---|
| *G02B 6/12* | (2006.01) |
| *G02B 6/293* | (2006.01) |
| *B82Y 20/00* | (2011.01) |
| *G02F 1/035* | (2006.01) |
| *G02B 6/122* | (2006.01) |
| *G02F 1/01* | (2006.01) |

(Continued)

(52) U.S. Cl.
CPC ......... *G02B 6/12007* (2013.01); *B82Y 20/00* (2013.01); *G02B 6/1228* (2013.01); *G02B 6/29341* (2013.01); *G02F 1/0147* (2013.01); *G02F 1/035* (2013.01); *G02F 1/212* (2021.01); *G02F 1/225* (2013.01); *G02F 2201/30* (2013.01); *G02F 2202/20* (2013.01); *G02F 2202/32* (2013.01); *G02F 2203/50* (2013.01)

(58) Field of Classification Search
None
See application file for complete search history.

(56) References Cited

U.S. PATENT DOCUMENTS

| | | | |
|---|---|---|---|
| 6,009,115 A | * | 12/1999 | Ho .................. H01S 5/1075 385/24 |
| 6,298,177 B1 | | 10/2001 | House |
| 7,068,865 B2 | | 6/2006 | Hamann et al. |

(Continued)

FOREIGN PATENT DOCUMENTS

WO    WO 2016/138506 A2    9/2016

OTHER PUBLICATIONS

Jingya Xie, Linjie Zhou, Xiaomeng Sun, Zhi Zou, Liangjun Lu, Haike Zhu, Xinwan Li, and Jianping Chen, "Selective excitation of microring resonances using a pulley-coupling structure," Appl. Opt. 53, 878-884 (2014). (Year: 2014).*

(Continued)

*Primary Examiner* — Rhonda S Peace
(74) *Attorney, Agent, or Firm* — Baker Botts LLP

(57) ABSTRACT

The systems described herein can be used to modulate either the phase, the amplitude, or both of an input light wave using micro-resonators to achieve desired degrees and/or types of modulation.

20 Claims, 29 Drawing Sheets

(51) Int. Cl.
  *G02F 1/21* (2006.01)
  *G02F 1/225* (2006.01)

(56) References Cited

U.S. PATENT DOCUMENTS

| | | | |
|---|---|---|---|
| 7,092,590 B2* | 8/2006 | Lim | G02F 1/011 |
| | | | 385/30 |
| 7,242,705 B2* | 7/2007 | Kneissl | H01S 5/1075 |
| | | | 372/67 |
| 7,272,271 B2 | 9/2007 | Kaplan et al. | |
| 7,440,703 B2 | 10/2008 | Shastri et al. | |
| 7,751,654 B2 | 7/2010 | Lipson et al. | |
| 8,483,521 B2* | 7/2013 | Popovic | G02B 6/29338 |
| | | | 385/5 |
| 8,670,476 B2* | 3/2014 | Goddard | H01S 5/142 |
| | | | 372/64 |
| 9,081,135 B1* | 7/2015 | Jones | G02F 1/218 |
| 9,081,215 B1* | 7/2015 | Zortman | G02F 1/0147 |
| 9,435,803 B2* | 9/2016 | Scherer | G01N 33/566 |
| 9,612,458 B1 | 4/2017 | Lentine | G02F 1/025 |
| 10,075,245 B2* | 9/2018 | Caplan | H04B 10/671 |
| 10,338,416 B2* | 7/2019 | Liang | G02B 6/29341 |
| 2005/0074209 A1* | 4/2005 | Baumann | G02B 6/12007 |
| | | | 385/50 |
| 2009/0226129 A1* | 9/2009 | Kuipers | G02F 1/3132 |
| | | | 385/14 |
| 2022/0308370 A1* | 9/2022 | Liang | G02F 1/035 |

OTHER PUBLICATIONS

Biberman et al., "Adiabatic microring modulators," Optics Express 20 (28), 14 pages (2012).

Exulus® Reflective Two-Dimensional Spatial Light Modulators (SLMs) Based on Liquid Crystal on Silicon (LCoS).

Feist et al., "Quantum coherent optical phase modulation in an ultrafast transmission electron microscope," Nature, 521, 200-203 (2015).

Mikkelsen et al., "Adiabatically widened silicon microrings for improved variation tolerance," Optics Express 22 (8), 8 pages (2014).

Olmedo et al., "Multiband Carrierless Amplitude Phase Modulation for High Capacity Optical Data Links," Journal of Lightwave Technology, 32, 798-804 (2013).

Pagán et al., "Linearized electrooptic microwave downconversion using phase modulation and optical filtering," Optics Express, 19, 883-895 (2011).

Sun et al., "Multiband Three-Dimensional Carrierless Amplitude Phase Modulation for Short Reach Optical Communications," Journal of Lightwave Technology, 34, 3103-3109 (2016).

Tiarks et al., "Optical π phase shift created with a single-photon pulse," Science Adv. 2, 1-5 (2016).

Wang et al., "Integrated lithium niobate electro-optic modulators operating at CMOS-compatible voltages," Nature, 562, 101-104 (2018).

* cited by examiner

| | | | | | | | | | |
|---|---|---|---|---|---|---|---|---|---|
| curved | 20 | 150 | 1616.0 | 0.90 | 4,353 | 170,225 | 4,362 | 20.0 | 26 |
| straight | 15 | 150 | 1552.0 | 0.88 | 3,695 | 121,625 | 3,811 | 31.9 | 31 |
| curved | 15 | 150 | 1575.5 | 0.88 | 7,161 | 225,732 | 7,396 | 30.5 | 59 |
| curved | 20 | 200 | 1606.7 | 0.82 | 5,539 | 114,787 | 5,920 | 19.7 | 34 |
| curved | 20 | 150 | 1615.0 | 0.78 | 8,614 | 79,708 | 4,858 | 16.3 | 29 |
| curved | 20 | 200 | 1616.0 | 0.76 | 7,346 | 112,720 | 7,858 | 14.3 | 45 |
| curved | 20 | 250 | 1605.1 | 0.65 | 2,918 | 29,830 | 3,235 | 9.2 | 18 |
| curved | 20 | 250 | 1614.9 | 0.55 | 2,833 | 31,743 | 3,258 | 6.7 | 18 |
| straight | 20 | 200 | 1666.0 | 0.51 | 4,745 | 32,823 | 5,548 | 5.9 | 58 |
| straight | 10 | 150 | 1566.0 | 0.48 | 6,525 | 42,718 | 7,701 | 5.5 | 79 |
| straight | 15 | 250 | 1564.0 | 0.34 | 6,015 | 38,564 | 7,620 | 3.7 | 50 |
| straight | 10 | 300 | 1569.0 | 0.30 | 9,229 | 41,042 | 11,907 | 3.4 | 112 |
| straight | 10 | 250 | 1566.0 | 0.29 | 13,046 | 52,449 | 15,638 | 3.4 | 146 |
| straight | 10 | 150 | 1561.0 | 0.24 | 1,249 | 4,929 | 1,673 | 2.9 | 15 |
| straight | 10 | 400 | 1567.0 | 0.24 | 6,509 | 35,650 | 8,759 | 2.9 | 79 |
| straight | 10 | 150 | 1561.0 | 0.23 | 1,323 | 5,083 | 1,788 | 2.8 | 16 |
| straight | 15 | 300 | 1564.0 | 0.12 | 7,820 | 23,666 | 11,679 | 2.0 | 65 |

Fig. 10

AMPLITUDE AND PHASE LIGHT MODULATOR BASED ON MINIATURE OPTICAL RESONATORS

CROSS REFERENCE TO RELATED APPLICATIONS

This application claims the benefit of U.S. Provisional Patent Application No. 62/838,084, filed on Apr. 24, 2019, and U.S. Provisional Patent Application No. 62/828,261, filed on Apr. 2, 2019, the entirety of which are both incorporated by reference herein.

GRANT INFORMATION

This invention was made with government support under grant numbers HR00111720034 awarded by the Defense Advanced Research Project Agency (DARPA) and FA9550-14-1-0389 awarded by the Air Force Office of Scientific Research (AFOSR MURI). The government has certain rights in the invention.

BACKGROUND

Certain optical modulators can be used in photonic systems for on-chip optical routing and free-space wavefront shaping. For example, certain optical amplitude modulators and optical phase modulators can be employed to realize a diverse range of applications, including optical switching fabrics, artificial neural networks, light ranging and detection, free-space optical communication, phased-array imaging, augmented and virtual reality display, quantum information processing, nonlinear optics, optical sensing, and optogenetics.

Certain optical phase modulators can be based on phase accumulation through light propagation in a waveguide with tunable refractive indices. Due to the narrow refractive index change of certain materials induced by thermo-optic or electro-optic effect, a phase shifter can demand a long propagation length (e.g., in the range of 1-10 mm) leading to increased system size. Although certain plasmonic structures can enhance light-matter interaction and reduce system size, they can amplify device insertion losses. Certain resonant structures can be employed to improve performance of amplitude modulators. However, such resonant structures can provide a narrow range of phase modulation.

Thus, there is a need for improved techniques for controlling a spatial distribution of amplitude and phase of light to improve the performance of a photonic system or to realize new system functionalities.

SUMMARY

The disclosed subject matter provides systems and methods for controlling the amplitude and phase of light in connection with a photonic system.

In certain embodiments, a photonic system is disclosed which can control spatial distribution of amplitude and phase of light using an array of pixels. In non-limiting embodiments, the disclosed system can include at least one 1D or 2D array of pixels. Each pixel can include a device to modulate amplitude and/or phase of light waves propagating in a waveguide. The device can be a phase modulator and/or an amplitude modulator. In some embodiments, the device can include an optical micro-resonator. The disclosed photonic system can control and/or adjust interactions between guided light waves and the optical micro-resonator through a signal tuner that reacts to external electric signals and can alter the reflective index of the optical micro-resonator. For example, a voltage can be applied to a micro-heater or a pair of electrodes to tune the resonance frequency of the optical resonator resulting in amplitude and phase change.

In certain embodiments, the system can include a platform of integrated photonics. For example, the platform can include an integrated Si, an integrated LiNbO3, an integrated Si3N4, and/or transition metal dichalcogenide (TMD) monolayers. The platform can operate in the visible (e.g., $\lambda$=400~700 nm) and telecommunications (e.g., $\lambda$=~1.55 µm) bands. In non-limiting embodiments, the platform can further include at least one micro-heater. In some embodiments, the disclosed system with the integrated LiNbO$_3$ platform can include at least two electrodes patterned on the two sides of the resonator. A control voltage can be applied between the electrodes and produce an in-plane electric field in the transverse direction with respect to the light propagation direction in the system. This electric field can induce a change in the refractive index of LiNbO3 through the electro-optical effect, which can lead to modulation of light transmitted through the device. The integrated LiNbO3 platform can provide an increased modulation speed (e.g., >1 GHz).

In certain embodiments, the optical resonator can be a ring resonator and/or a disk resonator. The optical resonator can be coupled to waveguides through evanescent coupling. In non-limiting embodiments, the optical resonator can be a one-dimension (1D) photonic crystal cavity embedded in waveguides. The disclosed 1D photonic crystal resonators can provide a reduced footprint, e.g., 2 micron×20 micron in the NIR and 1 micron×10 micron in the VIS. In non-limiting embodiments, structural parameters of the resonators can be adjusted to provide target resonance frequencies and coupling strengths of resonant modes. The frequency of resonant mode can further be tuned by adjusting the material refractive index of the optical resonator, e.g., by applying a voltage. In some embodiments, a target frequency can be achieved through thermo-optic effects via a micro-heater. In certain embodiments, the target frequency can be achieved through electro-optic effects via electrodes. In non-limiting embodiments, the target frequency can be achieved through field effects that can change carrier concentrations on TMD monolayers of the system.

Interference between a background signal and the resonator output can help achieve pure phase modulation, i.e., a $2\pi$ phase modulation with minimal amplitude modulation. For example, in a 1D photonic crystal resonator, the background signal can be produced by reflection, such as by inclusion of two back-to-back width perturbed distributed Bragg reflectors or DBRs, which can generate a reflection. In a micro-ring resonator, the background can be provided by direct transmission through the waveguide. In certain embodiments, the disclosed system can provide a near $2\pi$ pure phase modulation. For example, the disclosed system can provide the near $2\pi$ pure phase modulation by coupling of light from waveguide into a resonator one order of magnitude larger than the decay rate due to the combination of scattering, bending, and absorption losses in the resonator (i.e., over-coupling regime). In non-limiting embodiments, the disclosed system can include at least two resonators. For example, two ring resonators with the same resonant frequency can be cascaded to provide $4\pi$ phase modulation across the resonance.

In non-limiting embodiments, the disclosed system can provide a 0-100% amplitude modulation. For example, the disclosed system can provide the 0-100% amplitude modulation by coupling light from waveguides to resonators, where the coupling rate is equal to the sum of scattering and absorption losses in the resonator (which can be referred to as a critical-coupling regime). In non-limiting embodiments, micro-resonators can be designed to operate in such a critical coupling regime where across a resonance the optical amplitude can have a complete variation from 0 to 1.

In some embodiments, the disclosed system can provide a near $2\pi$ pure phase modulation and a 0-100% amplitude modulation by combining the amplitude modulator and the pure phase modulator. The combination of the amplitude modulator and the pure phase modulator can provide independent and complete modulation of amplitude and phase of light in a waveguide. For example, a first micro-resonator operating in the critical coupling regime and a second micro-resonator operating in the strongly over-coupling regime can provide complete and independent modulation of optical amplitude and phase.

In certain embodiments, the disclosed system can convert amplitude and phase distributions of light on the pixel array to amplitude and phase distributions of light in the far-field, and vice versa. For example, the disclosed system can be employed in a projector configuration and convert light propagating in waveguides into far-field radiation. The wavefront of the far-field radiation can be controlled by electrical signals applied to the pixel array. In non-limiting embodiments, the disclosed system can be employed in a holography projector and provide a complete and dynamic control of amplitude and phase distributions of light in the far-field (i.e., dynamic 3D display). In some embodiments, the disclosed system can provide independent control of light. For example, the system can function as a pure amplitude spatial light modulator or a phase spatial light modulator. The pure phase spatial light modulator can steer a coherent light beam over a solid angle in the far-field.

In certain embodiments, the disclosed system can provide pure-phase modulation with zero insertion losses. For example, an input mode can couple into a pair of identical 1D photonic crystal resonators through a multimode interference (MMI) device. The two 1D resonators can share the same control voltage or control micro-heater so that they can be modulated by the same degree. The 1D resonators can be terminated with distributed Bragg reflector (DBR) gratings and produce two modulated reflected light waves that constructively interfere to couple all optical power into an output port. The output signal can have a $2\pi$ modulation and minimal amplitude variation across an optical resonance.

In certain embodiments, the disclosed system can be employed in a detector configuration and convert an incident light beam from the far field into a waveguide output. For example, a light beam incident from a specific angle can couple into the pixel array, then into the waveguide array associated with the pixel array, and then into a guided wave in the bus waveguide, which can be detected. In non-limiting embodiments, a light detection and ranging (LIDAR) system can combine the projector and detector functions in a single system. For example, the LIDAR system can be created based on optical micro-resonators. A phased array of micro-ring resonators can operate in the over-coupling regime and control a beam steering in a first direction. Beam steering in a second direction can be controlled by an array of 1D photonic crystal modulators that can be side-coupled to waveguides. A 1D modulator can be tuned to be on resonance with the wavelength of the incoming light and resonantly scatter the light vertically out with decreased in-line transmission and reflection. In some embodiments, the modulator can be off resonance with the incoming light, and the light can pass through the waveguide with high transmission. In non-limiting embodiments, the LIDAR system can be used in the transmitter mode and/or receiver mode.

For example, a cylindrical lens can be placed above the array of 1D photonic crystal modulators, which can translate the emission from different columns of the 1D modulators to different emission angles in the far field. The lens can provide for independent control of the beam. In a receiver mode, the angular positions along the first and second directions of the incoming beam can be determined by certain column of 1D photonic crystal resonators that can tuned to be on resonance with the frequency of the incoming light, and the phase gradient used by the array of micro-ring resonators.

In certain embodiments, the disclosed system can provide a decreased device footprint, a reduced power consumption, and an improved operating speed for photonic systems. The disclosed system can modulate spatial light for both amplitude and phase simultaneously (or independently) based on optical resonators.

In certain embodiments, the disclosed system can be employed in an augmented reality (AR) or a virtual reality (VR) system. For example, the disclosed system can provide a holographic display screen in the AR/VR system. In non-limiting embodiments, the disclosed system can be employed in an optical network-on-chip (ONoC) for optical communication and processing.

BRIEF DESCRIPTION OF THE DRAWINGS

FIG. 10 illustrates a systematic exploration of device parameter space to achieve strong over-coupling.

DETAILED DESCRIPTION

Reference will now be made in detail to the various exemplary embodiments of the disclosed subject matter which are illustrated in the accompanying drawings. The systems and methods described herein can be used, for the purpose of example and not limitation, to control the spatial distribution of amplitude and phase of light using a plurality of pixels. The disclosed systems and methods can control and/or adjust interactions between guided light waves and an optical micro-resonator through a signal tuner that reacts to external electric signals.

Figure 1:
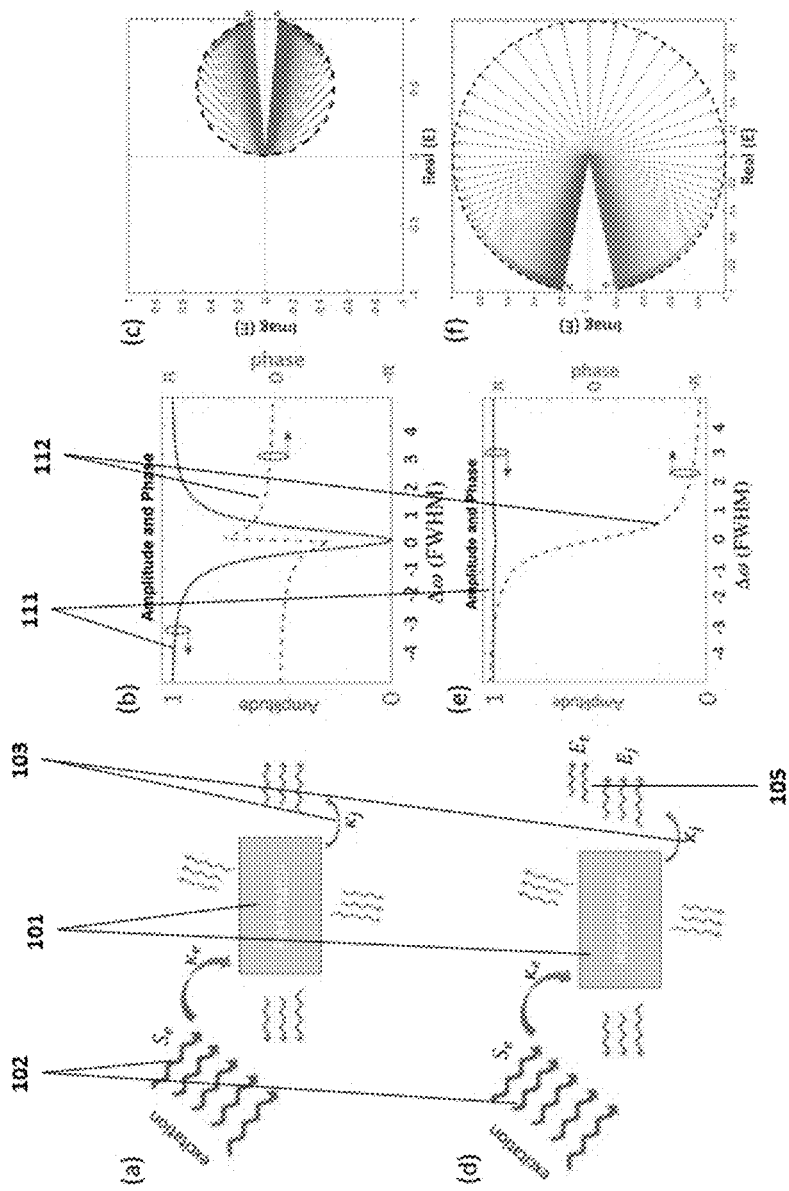
FIGS. 1(a)-(f) illustrate exemplary optical response of a resonator with (a) showing an optical resonator excited by an external wave, (b) showing optical amplitude and phase of a j-th radiation channel of the resonator, (c) showing electric field trajectory in the complex E plane, (d) showing interference between background radiation and radiation from the resonator, (e) showing calculated pure phase modulation, and (f) showing electric field trajectory in the complex E plane.

In an exemplary general case, illustrated in FIG. 1(a), a resonator 101 can be excited by an external wave 102 with an amplitude of $S_e$, with an equation of motion given by:

$$\frac{da}{dt} = \left(i\omega_0 - \frac{1}{\tau_0} - \frac{1}{\tau_e}\right)a + \kappa_e S_e \quad (1)$$

Wherein $\omega_0$ is the resonant frequency, $1/\tau_0$ is the decay rate due to loss, $1/\tau_e$ is the decay rate due to outgoing radiation, including coupling into a j-th radiation channel 103 which leaves the resonator, and $\kappa_e$ characterizes a coupling between the excitation field and a resonant mode. Assuming that the harmonic excitation has a time dependence of $e^{j\omega t}$, Eq. 1 yields:

$$a = \frac{\kappa_e S_e}{j(\omega - \omega_0) + \frac{1}{\tau_e} + \frac{1}{\tau_0}} \quad (2)$$

Thus, the electric field in the j-th radiation channel 103 is given by the equation:

$$E_{out} = \kappa_j a \quad (3)$$

The amplitude response 111 and the phase response 112 are shown by FIG. 1(b). The phase response 112 varies by $\pi$ accompanied by a complete amplitude modulation 111 between 0 and 1. Plotting the trajectory of the electric field in the complex E plane is shown in FIG. 1(c). This trajectory, as seen by Eq. 3, is a circle with a radius given by $$\vec{E}_0 = \frac{\kappa_j \kappa_e S_e \tau_e \tau_0}{2(\tau_e + \tau_0)} \quad (4)$$

with a center at $$\frac{\vec{E}_0}{2}.$$

It follows that if one can bring the center of the trajectory circle to the origin, there will be a pure phase modulation without amplitude modulation. The present disclosure achieves this result by adding to the resonator radiating field 103 a background field 105 which modifies Eq. 3 to become:

$$E_{out} = \frac{\kappa_j \kappa_e S_e}{j(\omega - \omega_0) + \frac{1}{\tau_e} + \frac{1}{\tau_0}} + E_t \quad (5)$$

The result of adding the background field 105 to the resonator 101 is shown in FIG. 1(e). The amplitude response 111 undergoes minimal intensity variation over the resonance, whereas the phase response 112 undergoes a $2\pi$ shift over the same resonance, indicating pure-phase modulation. FIG. 1(f) shows graph representing the electric field in the complex E plane when a background field 105 is introduced to the resonator 101.

In one exemplary embodiment, pure-phase modulation can be achieved by the use of micro-resonators in a strongly over-coupled regime. A strongly over-coupled regime refers to a situation where the coupling rate between a resonator and a waveguide is much larger than the decay rate due to the combination of scattering an absorption loses in the resonator. The Q factor can be related to the decay rate by $Q = \omega\tau/2$, and therefor $Q_{Load} \ll Q_0/2$, where $Q_{Load}$ and $Q_0$ are, respectively the loaded/external and intrinsic Q factors of the resonator.

Figure 2:
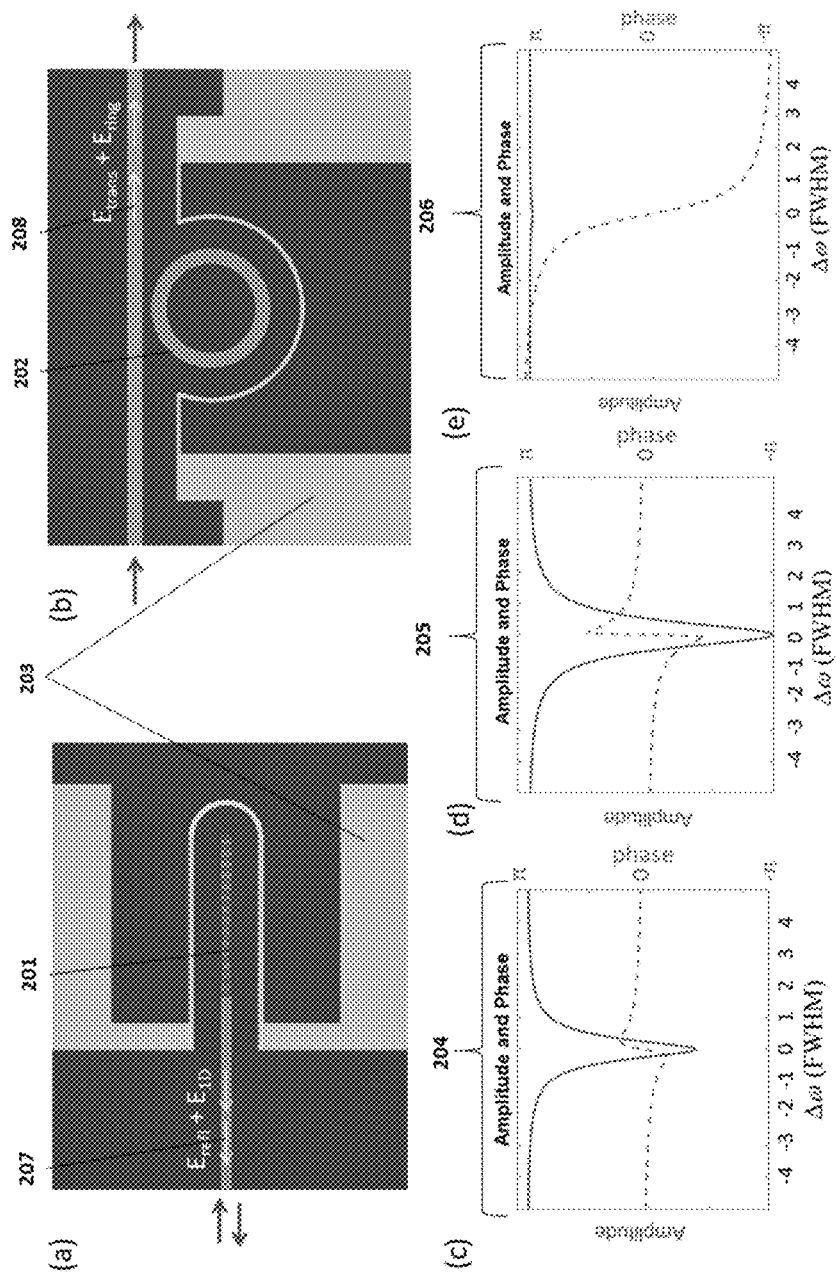
FIGS. 2(a)-(e) illustrate an exemplary implementation of pure phase modulators in a 1D photonic crystal resonator and a micro-ring resonator with (a) showing an exemplary 1D photonic crystal resonator, (b) showing an exemplary micro-ring resonator, (c) showing response of a resonator in an under-coupled regime, (d) showing response of a resonator in a critically-coupled regime, and (e) showing response of a resonator in a strongly over-coupled regime.

FIG. 2(a) shows one exemplary embodiment of the present disclosure is a 1D photonic crystal resonator 201 which can have a footprint of about 2 microns by 20 microns in the near infrared (NIR) and 1 micron by 10 microns in the visual spectral range (VIS). Interference between a background signal and the resonator 201 can achieve pure-phase modulation (i.e. $2\pi$ a phased modulation with minimal amplitude modulation). In this embodiment, the background signal 207 can be produced by reflection. This reflection can be achieved, for the purpose of example and not limitation, where the 1D photonic crystal resonator 201 is comprised of two back-to-back width perturbed distributed Bragg reflectors (DBRs), which generate the reflection background signal 207.

Another exemplary embodiment is shown by FIG. 2(b). A micro-ring resonator 202, which can have a footprint of about 20 microns by 20 microns in the NIR and 10 microns by 10 microns in the VIS, can, similar to the 1D photonic crystal resonator 201, achieve pure-phase modulation due to interference between a background signal and the resonator 202. In a micro-ring resonator, the interference 208 can be provided by directed transmission through the waveguide. Graphs, shown in FIGS. 2(c)-(e) illustrate, respectively, the operation of resonators in the under-coupling, 204, critical coupling 205, and strongly over-coupling 206 regimes. As can be seen, only the strongly over-coupled regime 206 produces pure phase modulation with minimal amplitude variation.

The term "about" or "approximately" means within an acceptable error range for the particular value as determined by one of ordinary skill in the art, which will depend in part on how the value is measured or determined, i.e., the limitations of the measurement system. For example, "about" can mean within three or more than three standard deviations, per the practice in the art. Alternatively, "about" can mean a range of up to 20%, up to 10%, up to 5%, and up to 1% of a given value.

Figure 3:
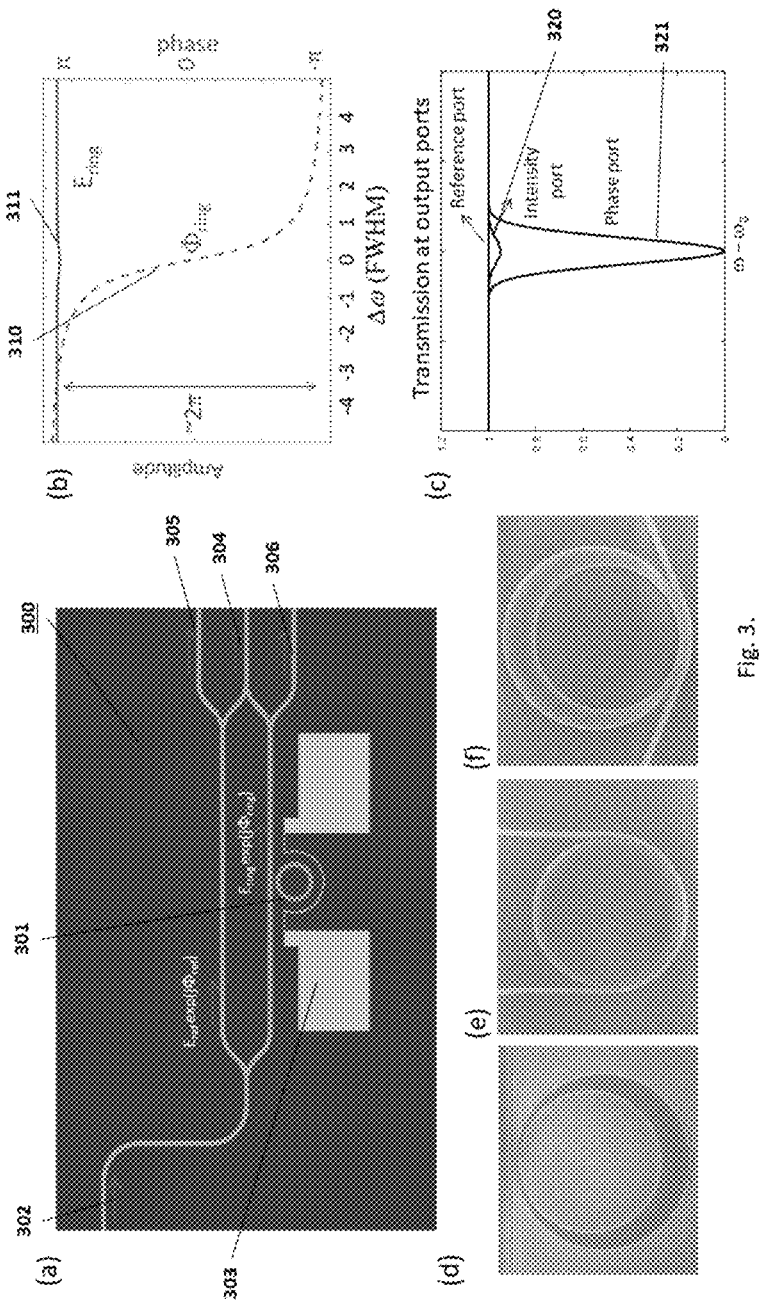
FIGS. 3(a)-(f) illustrate an exemplary pure-phase modulator based on an over-coupled $Si_3N_4$ micro-ring resonator with (a) showing a micro-ring resonator embedded in a Mach-Zehnder interferometer (MZI), (b) showing simulated responses of the resonator, (c) showing expected spectra from the output ports of the MZI, and (d), (e), and (f) showing, respectively, an adiabatic micro-ring resonator, a micro-disk resonator, and an adiabatic micro-ring resonator with a wrapped pulley waveguide.

In another exemplary embodiment, as illustrated by FIG. 3(a), pure-phase modulation can be achieved based on over-coupling of a $Si_3N_4$ (Silicon Nitride) micro-ring resonator 301. In order to investigate the phase and amplitude modulation of a micro-ring resonator, which for the purpose of example and not limitation, can be made from Silicon Nitride 301, a Mach-Zehnder interferometer (MZI) 300 configuration can be employed. In such a setup, input light 302 is split into the two arms of the MZI. Along a first arm is a micro-ring resonator 301, which can generate an output of $E_{ring}e^{j\Phi}ring$, while along a second arm acts as a bare waveguide, to serve as a reference and generates an output of $E_{ref}e^{j\Phi}ref$. If the resonator 301 is operating in the strongly over-coupled regime, amplitude and phase response will occur as shown in FIG. 3(b), where $\Phi_{ring}$ 310 will undergo a change of about $2\pi$ and $E_{ring}$ 311 will have minimal variation across the resonance. This ensures that the outputs from the two MZI arms are $\pi$ out of phase with each other at a suitable micro-heater 303 power, such that their interference will produce zero intensity at the "phase" port 304. The "intensity" port 306 can monitor amplitude modulation in the first MZI arm (which contains the micro-ring resonator 301). Exemplary output from the system 300 is shown in FIG. 3(c). Considered together, a flat intensity port spectrum 320 and a dip reaching zero in the phase port spectrum 321 can indicate pure phase modulation over $\pi$, which in turn can indicate that the resonator 301 operates in the strongly over-coupled regime.

While in the exemplary embodiment illustrated in FIG. 3(a), the resonator 301 was composed of silicon nitride, this is not intended to limit the present disclosure to such compositions. The present disclosure contemplates the use of the system in FIG. 3(a) to test micro-ring resonators of any composition and configuration in order to determine whether or not they operate in a strongly over-coupled regime, a critically coupled regime, or an under-coupled regime. Several variations of micro-ring resonators can be envisioned, for example, an adiabatic micro-ring resonator coupled to a straight bus waveguide FIG. 3(d), a micro-disk resonator with a pulley coupler wrapped around it FIG. 3(e), and an adiabatic micro-ring with a pulley coupling FIG. 3(f). For the purpose of example not limitation, the resonators depicted in FIGS. 3(d)-(f) have outer radii of 5 µm. In order to achieve strong over-coupling, one can increase the coupling strength (either by reducing the gap between the resonators and the bus waveguide or by lengthening the coupling distance) and reduce the material and scattering loss.

In an exemplary adiabatic ring, for example, FIGS. 3(d), (f), the narrow portion of the ring at the coupling region can enable sufficient coupling to the bus waveguide and ensure that only the fundamental waveguide mode exists in the micro-ring, while the widened portion of the ring reduces scattering loses from the roughness of the sidewall. The latter effect is due to the fact that light confined in a wide waveguide experiences less scattering by sidewall roughness. Curved bus waveguide wrapping around the micro ring 322 can also further enhance the coupling strength. The presently disclosed subject matter also contemplates reducing scattering loss by using micro-disk resonators 321, since the optical mode is more confined within the resonator compared to micro-rings and there is only one sidewall. However, such resonators can make the coupling between the micro-disk and the bus waveguide weak. Therefore, the presently disclosed subject matter further contemplates providing a pulley coupler with a longer coupling length. Additionally, undesirable higher-order waveguide modes that do not operate in the strongly over-coupling regime can exist in the micro-disk structures, as opposed to the micro-ring designs where the narrowest part of the ring eliminates higher-order waveguide modes.

Figure 4:
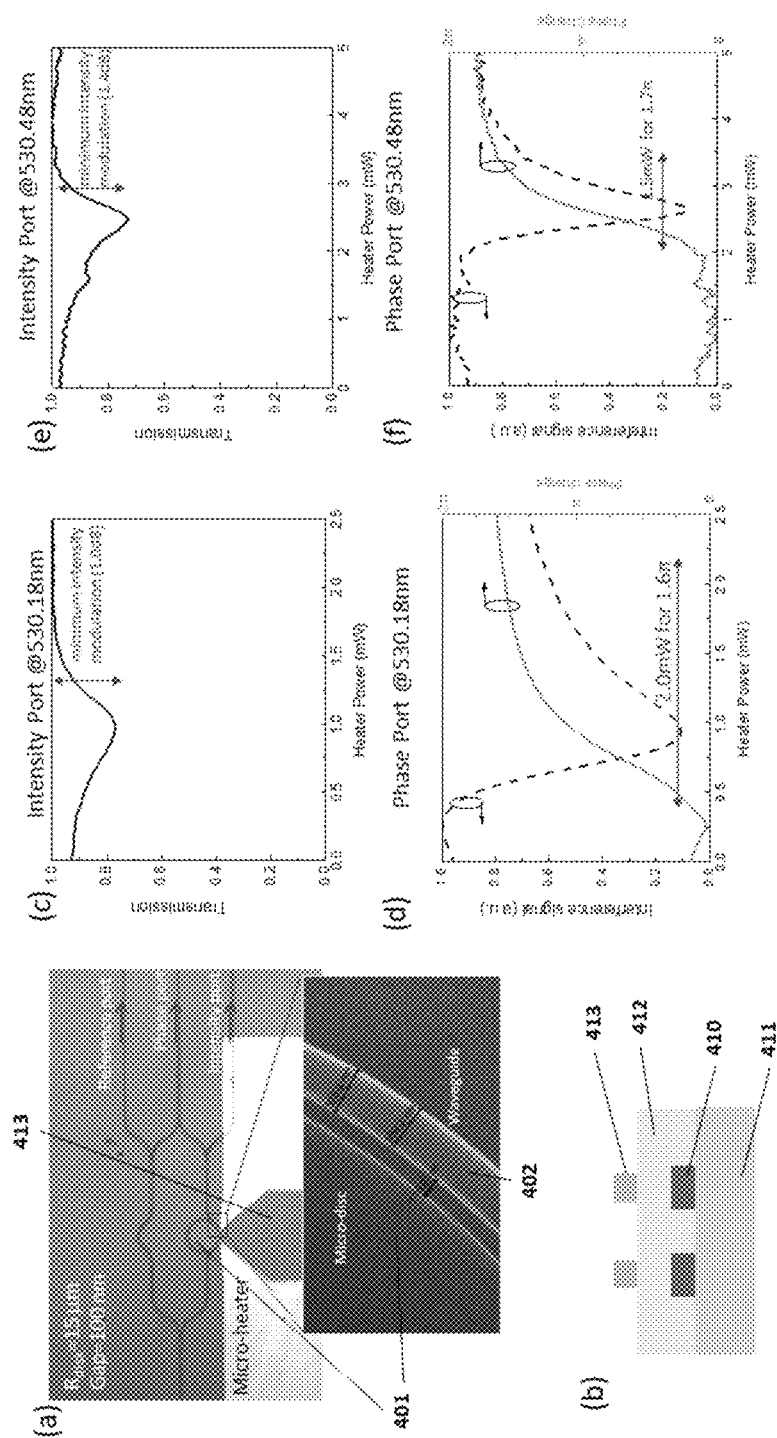
FIGS. 4(a)-(f) illustrate exemplary pure phase modulation based on micro-disk resonators operating in the visible spectral range with (a) showing an optical microscope image of a fabricated micro-disk resonator, (b) showing a cross section view of the device in (a), (c) and (d) showing response of a resonator as a function of micro-heater power at 530.18 nm, and (e) and (f) showing response of a resonators as a function of micro-heater power at 530.48 nm.

Another exemplary embodiment of the disclosed subject matter, namely pure phase modulation based on micro-disk resonators operating in the visible spectral range, is illustrated in FIGS. 4(a)-(f). As shown in FIG. 4(a), a SiN (Silicon Nitride) micro-disk resonator can be wrapped by a pulley waveguide coupler 402 around one quarter of of the resonator's 401 circumference. For the purpose of example not limitation, a cross section of the resonator 401 is shown in FIG. 4(b), wherein the micro-disk resonator 402 is 15 µm in radius, the pulley waveguide coupler 402 is 280 nm wide, the gap between the micro-disk 401 and the waveguide 402 is about 100 nm and the thickness of the micro-disk is 190 nm. The silicon nitride structure 410 is located on a $SiO_2$ (silicon dioxide) substrate 411 and embedded within a silicon dioxide cladding 412, atop which sits a platinum micro-heater 413. In the present embodiment, a narrow linewidth green laser was used to characterize the device, however the present disclosure contemplates the use of other wavelengths of light to characterize devices. The last wavelength in the present embodiment was fine tuned to park at the red side of a resonance; that is a laser wavelength was chosen that was slightly longer than that corresponding to the center of the optical resonance. The platinum micro-heater 413 can be used to heat the micro-disk 401, resulting in increased refractive indices of the silicon nitride 410, which in turn leads to continuous red-shift of the resonance: eventually resulting in a variation of the optical response. Responses at the intensity port FIG. 4(c) and the phase port FIG. 4(d) at a wavelength of 530.18 nm are shown. Similarly, responses at the intensity port FIG. 4(e) and phase port FIG. 4(f) at 530.48 nm are shown. The dashed line curve in FIGS. 4(d) and (f) represent the signal from the phase port, while the solid curves in FIGS. 4(d) and (f) represent the extracted phase change. As can be seen, at 530.18 nm, the phase changes by $1.6\pi$ when the micro-heater power changes by 2.0 mW; meanwhile the output from the intensity port only changes by 1.0 dB, which corresponds to an 11% variation in amplitude. The nonzero minimum intensity of the phase port is due to a constant background. The coefficient relating the resonant wavelength shift and the heating power is 0.0322 nm/mW, determined by tuning the laser wavelength and heating power to get the same resonance. With this coefficient, the loaded and intrinsic Q factors can be calculated from to be $Q_{load}$=20,000 and $Q_0$=287,000, respectively, and $Q_{load} \ll Q_0$, indicating that the resonator 401 is operating in the strongly over-coupled regime.

Similar results can be observed at different wavelengths. For the purpose of example and not limitation, where the wavelength is 530.48 nm, as in FIGS. 4(e) and (f), the phase of the optical resonator changes by $1.7\pi$ when the micro-heater power changes by 1.5 mW, while the intensity of the optical resonator varies by 1.4 dB, corresponding to a 15% variation in amplitude. The smaller heating power range is due to a higher $Q_{load}$ of 22,000 (with a corresponding $Q_0$ of 328,000).

Figure 5:
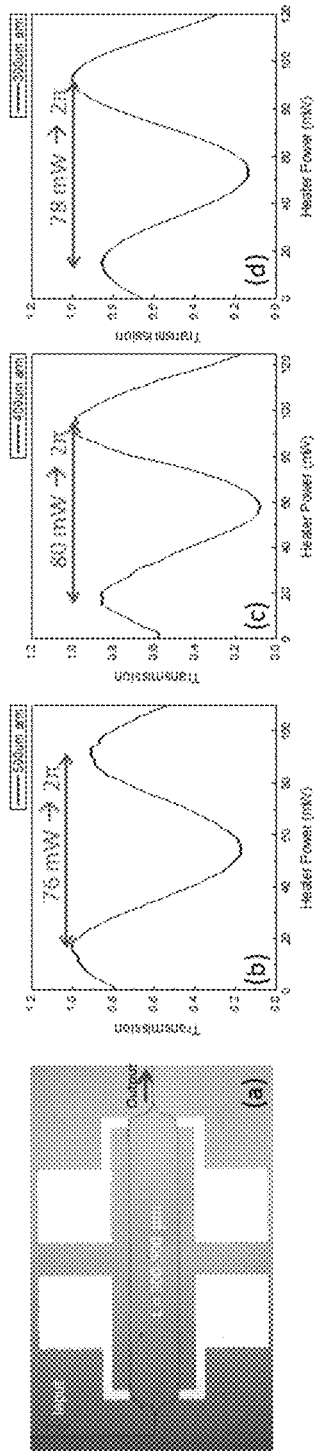
FIGS. 5(a)-(d) illustrate exemplary phase modulation in devices based on bare waveguides, with (a) showing a fabricated MZI device, (b) showing response in an MZI arm of length 500 nm, (c) showing response in an arm of length 400 nm, and (d) showing a response in an MZI arm of length 300 nm.

For the purpose of comparison and example rather than limitation, optical modulators can be fabricated based on MZI structures which consist of bare waveguides with varied arm lengths, for example between 300 and 500 micrometers, as illustrated in FIG. 5(a). By heating one of the MZI arms, a modulated interference signal can be observed from the output. In this embodiment, the results show that about 80 mW of heating power is required to achieve $2\pi$ phase tuning for the three different arm lengths, namely 500 nm, as in FIG. 5(b), 400 nm, as in FIGS. 5(c), and 300 nm, as in FIG. 5(d). Thus, the micro-disk devices embodied in the present disclosure and illustrated in, for example, FIG. 4(a), show a reduction in power consumption by a factor of about 40. This factor is approximately F/2, where F is the finesse of an optical micro-resonators and is related to $Q_{load}$ by $$F = \frac{\lambda Q_{load}}{n_{eff} L_{cav}} \quad (6)$$

where $n_{eff}$ is the effective group modal index of the resonant mode and $L_{cav}$ is the resonator cavity length. Additionally combining Eq. 6 with $$t = \left| \frac{2Q_{load}}{Q_0 - 1} \right| \quad (7)$$

where t is the minimum amplitude at the center of the resonance, suggests that in order to reduce power consumption of the phase modulator, $Q_{load}$ should be as large as possible and the footprint of the cavity ($L_{cav}$) as small as possible. Additionally, the ratio of $Q_{load}$ to $Q_0$ should be kept as small as possible in order to prevent significant amplitude variation. Another advantage of the presently disclosed subject matter is that the disclosed embodiments have a linear dimension of about ⅒ that of the MZI devices of FIGS. 5(b)-(d).

Figure 6:
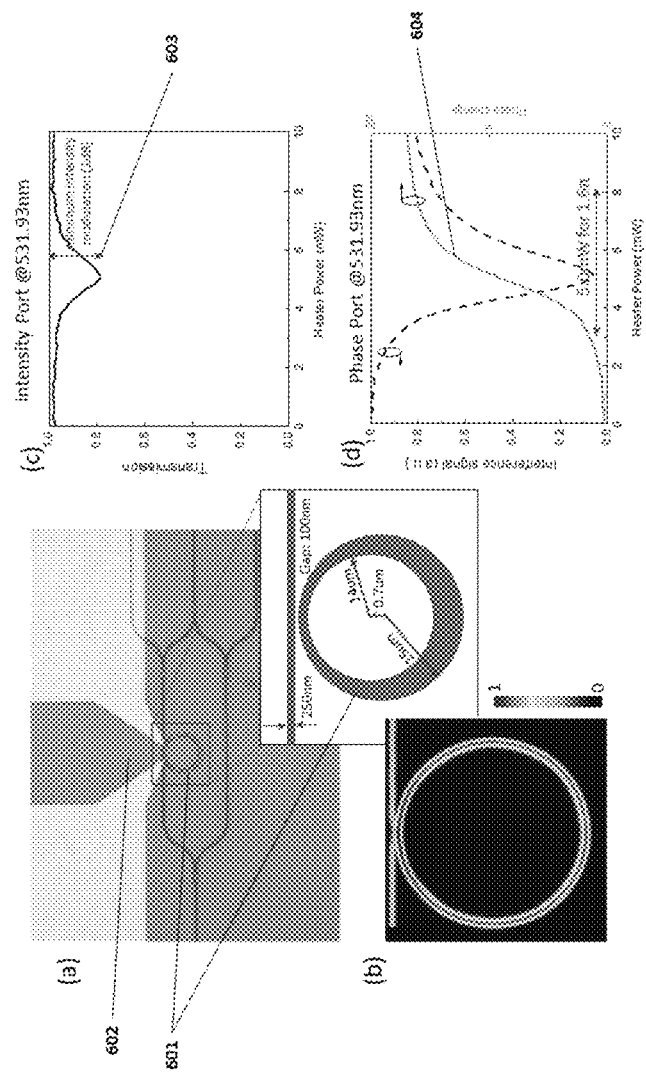
FIGS. 6(a)-(d) illustrate an exemplary device based on an adiabatic micro-ring resonator, with (a) showing an adiabatic micro-ring resonator embedded on an MZI arm, (b) showing the electric field distribution of the adiabatic micro-ring, (c) showing intensity port response, and (d) showing phase port response.

Pure phase modulation in an adiabatic micro-ring resonator 601 is demonstrated in FIGS. 6(a)-(d). For purpose of example not limitation, in this embodiment, the adiabatic micro-ring 601 has an inner ring radius $R_{in}$ of 14 μm and an outer ring radius $R_{out}$ of 15 μm. The center of the outer ring is offset a distance, d, from the center of the inner ring by 0.7 μm, which means that the narrowest section of the ring is 0.3 μm wide, and the widest section is 1.7 μm. The electric field distribution shown in FIG. 2(b), located at the center of the optical resonance shows a smooth distribution of the electric field without any interference, indicating that the transition from the narrowest section to the widest section of the ring is smooth and thus adiabatic. It follows that, where $R_{out}$−$R_{in}$=1 μm and d=0.7 μm, the adiabatic condition will be met for any $R_{out}$≥5 μm as the transition is slower for larger rings. FIG. 6(c) shows the transmission response of at the intensity port as a function of heating power, as applied by a micro-heater 602. The intensity modulation 603 is about 1 dB across the resonance, corresponding to an 11% amplitude variation. The loaded Q factor is $Q_{load}$=10,000, and the intrinsic Q factor is $Q_0$=197,000. The free spectrum range (FSR) is 1.4 nm and the finesse is F=26. The latter predicts an improvement factor for power consumption of 13, which is consistent with the observation, shown in FIG. 6(d), that a 1.6π phase modulation is achieved when the micro-heater power changes by 5.0 mW 604.

Figure 7:
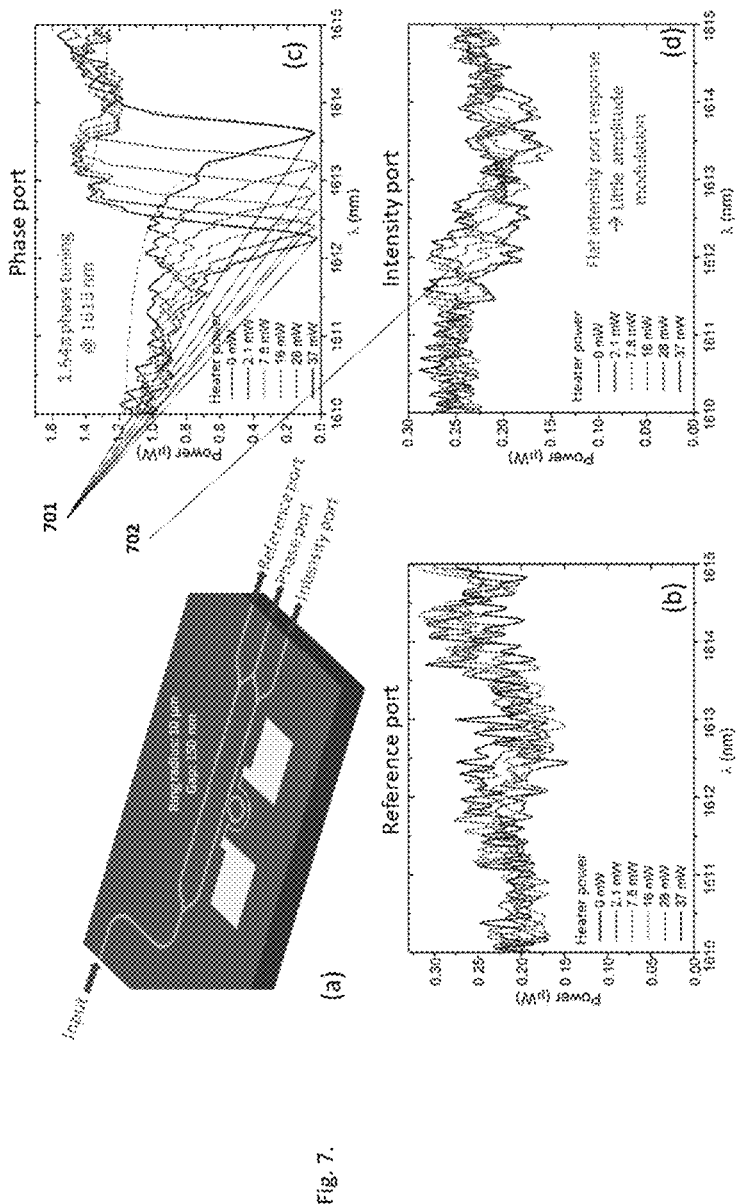
FIGS. 7(a)-(d) illustrates exemplary pure-phased modulation in an over-coupled SiN micro-ring resonator at telecom wavelengths, with (a) showing an exemplary micro-ring resonator, (b) showing reference port response at different micro-heater powers, (c) showing phase port response at different micro-heater powers, and (d) showing intensity port response at different micro-heater powers.

FIGS. 7(a)-(d) illustrate exemplary pure phase modulation in telecom wavelengths. The exemplary device of FIG. 7(a), consists of a micro-ring resonator embedded on an MZI device, and is configured to produce phase modulation with little to no amplitude modulation. As shown in FIG. 7(c) dips 701 can occur in the phase port with little amplitude modulation 702 seen in the intensity port, shown by FIG. 7(d), for a plurality of heater power ranging from 0 mW to 37 mW.

Figure 8:
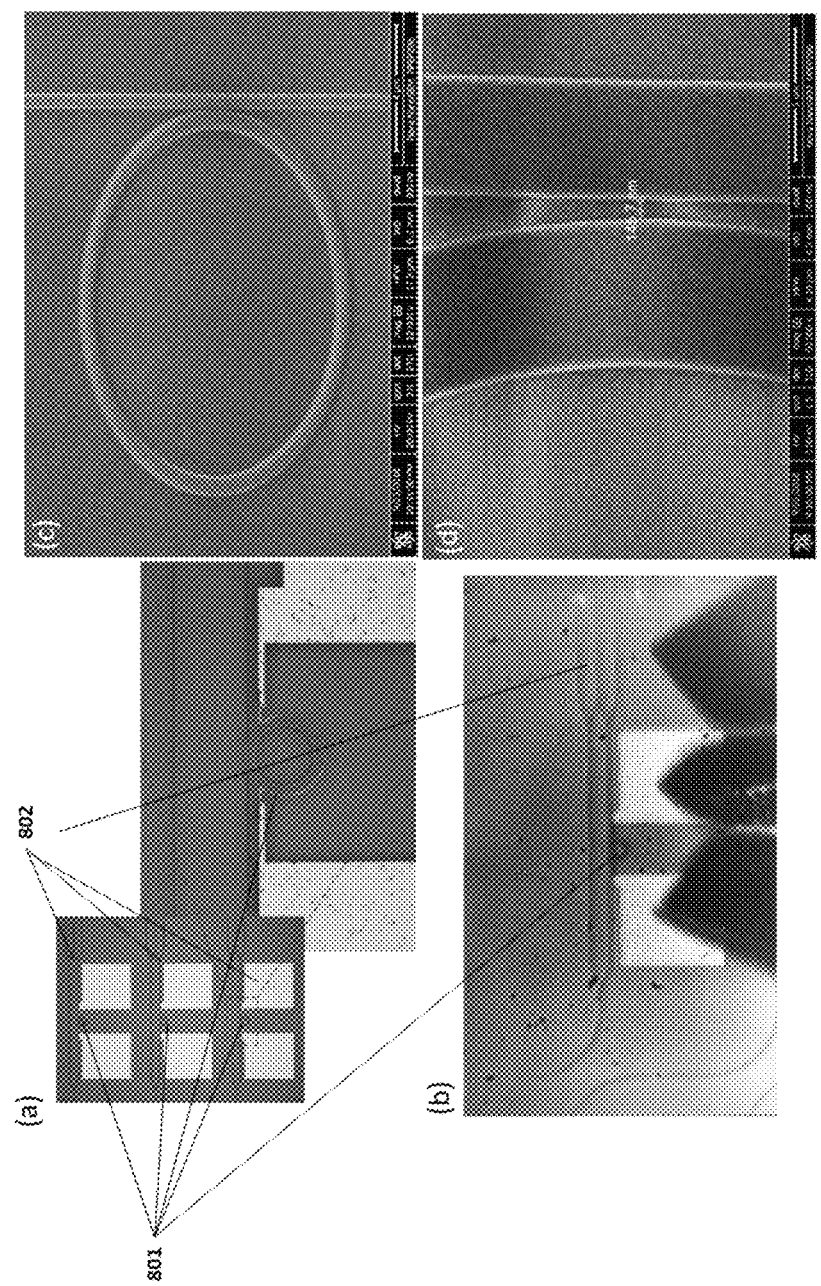
FIGS. 8(a)-(d) illustrates fabricated telecom pure-phase modulators based on SiN micro-ring resonators, with (a) showing photos of fabricated micro-ring resonators, (b) showing an exemplary device being tested, (c) showing an SEM image of micro-ring resonators, and (d) showing the gap between a micro-resonator and a bus waveguide.

FIGS. 8(a)-(d) illustrates exemplary fabricated pure-phase modulators according to the presently disclosed subject matter. In FIG. 8(a) Three micro-ring resonator devices 801 are incorporating into MZI circuits 802. FIGS. 8(c) and (d) show enlarged views of a micro-ring resonator device 801, illustrating the separation between the resonator 801 and its coupled waveguide.

Figure 9:
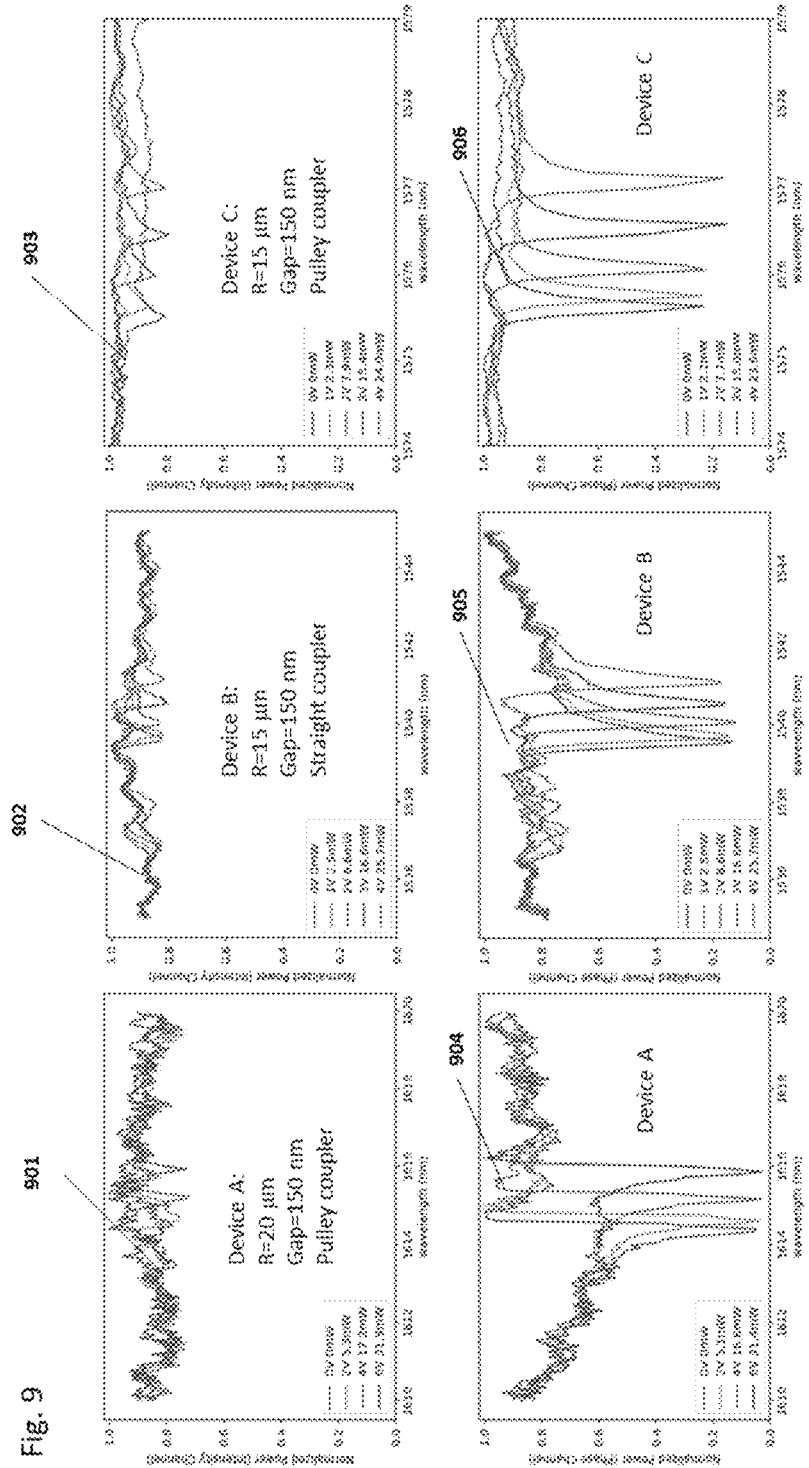
FIG. 9 illustrates exemplary telecom micro-ring resonators operating in a strongly over-coupled regime.

FIG. 9 illustrates various micro-ring resonators operating in the strongly over-coupled regime. The relatively flat amplitude modulations in device A 901, device B 902, and device C 903 viewed in light of the dips reaching to zero in the corresponding phase port spectra 904, 905, 906, indicate that each of the embodied devices operate in the strongly over-coupled regime and provide pure-phase modulation.

Various exemplary embodiments have been created and tested. FIG. 10 illustrates the results of such observations, with an aim to determine which type of design can reliably reach a strongly over-coupled regime. Specifically, FIG. 10 shows an exemplary selection of measured telecom ring-resonator based devices, sorted from best performance to worst performance as it relates to the degree of over-coupling achieved. The three best performing devices have a transmission at the center of the optical resonance of around 90%, which corresponds to an intensity (amplitude) modulation of less than 1 dB, while the phase modulation is 2π. FIG. 10 also suggests that curved or pulley couplers work better than straight couplers. Additionally, larger radii appear to work better than smaller radii. Devices with smaller gaps between the resonator and waveguide work better than those with larger gaps. In general, devices with a gap size smaller than 150 nm and a radius larger than 15 μm appear to operate in the strongly over-coupled regime. The devices depicted in FIG. 10 are provided as exemplary devices only, and are not intended to be limiting. The presently disclosed subject matter contemplates the creation of various other types of micro-resonators and other active materials platforms, including platforms based on integrated $LiNBO_3$.

Figure 11:
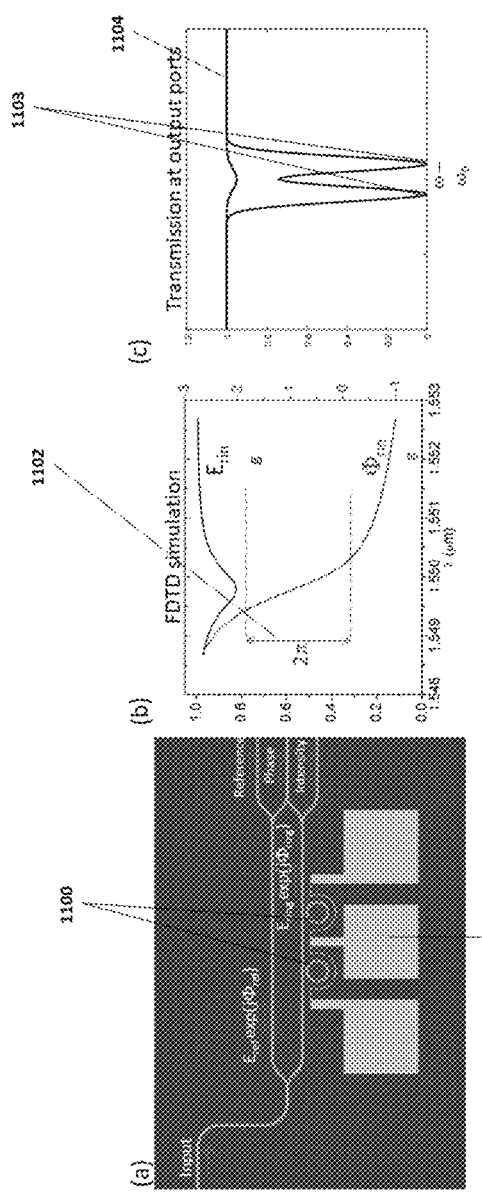
FIGS. 11(a)-(c) illustrate exemplary micro-ring resonators operating in the strongly over-coupled regime with (a) showing an exemplary double micro-ring resonator, (b) showing simulated responses of the resonator in (a), and (c) showing expected transmission spectra from the device in (a).

In addition to the embodiments already disclosed, the presently disclosed subject matter also contemplates using multiple subordinate micro-resonators in series or arranged in an array. For the purposes of example and not limitation, FIG. 11(a) illustrates a cascade configuration which uses two micro-disk resonators of the same resonant frequency 1100. Such a configuration can result in a phase shift across the resonance of 4π. Additionally, FIG. 11(b) illustrates that by operating in a relatively linear region of the phase profile 1102 less micro-heater 1101 power is required to achieve 2π phase tuning. The expected spectra from the phase and intensity ports in this MZI configuration are shown in FIG. 11(c). When the phase of the light input to the lower MZI arm (which contained the double micro-ring resonators 1100) is modulated so that it is π and 3π out of phase with the input light of the upper MZI arm, the intensity of the phase port will drop to zero 1103. If there is little amplitude modulation to the lower MZI arm, the intensity port will have little variation 1104. Together, a flat intensity port spectrum 1104 and two dips reaching zero in the phase port spectrum 1103 indicates pure phase modulation of 4π.

Figure 12:
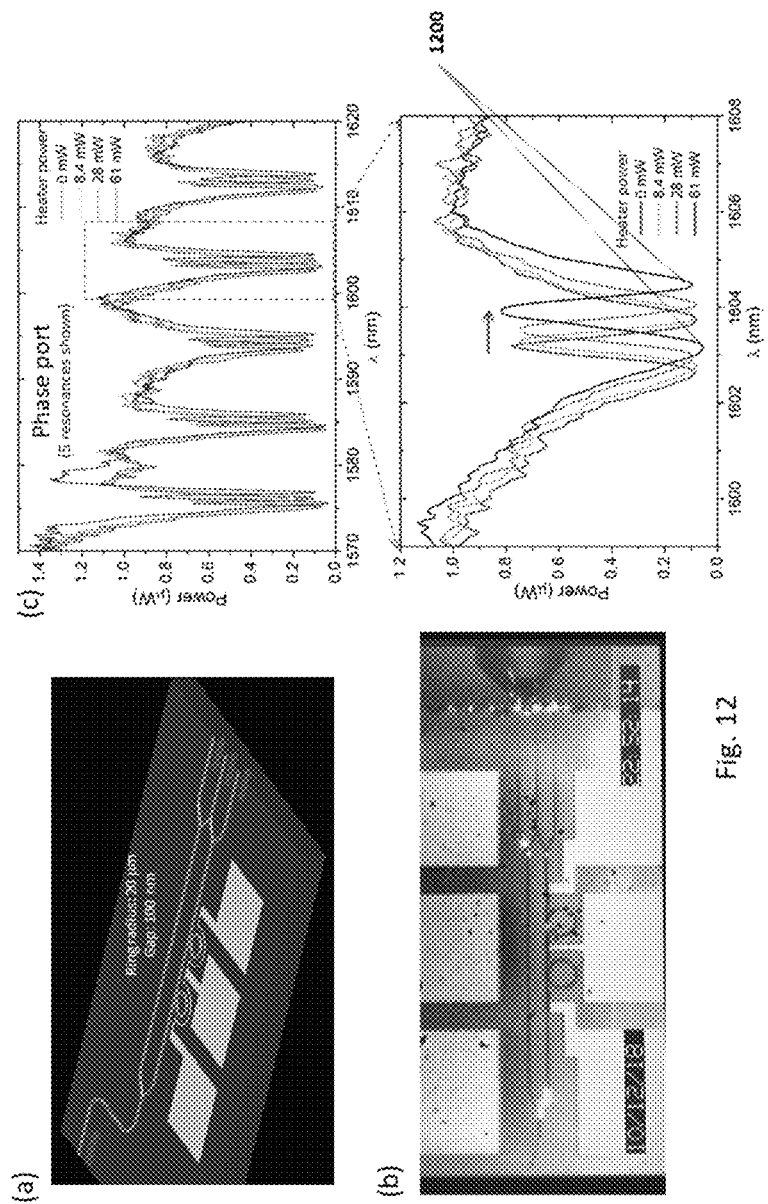
FIGS. 12(a)-(c) illustrate phase modulation in exemplary double micro-ring resonators, according to one embodiment of the disclosed subject matter with (a) showing an exemplary double micro-ring resonator, (b) showing a fabricated resonator based on the design in (a), and (c) showing phase port response of the device in (b).
Figure 13:
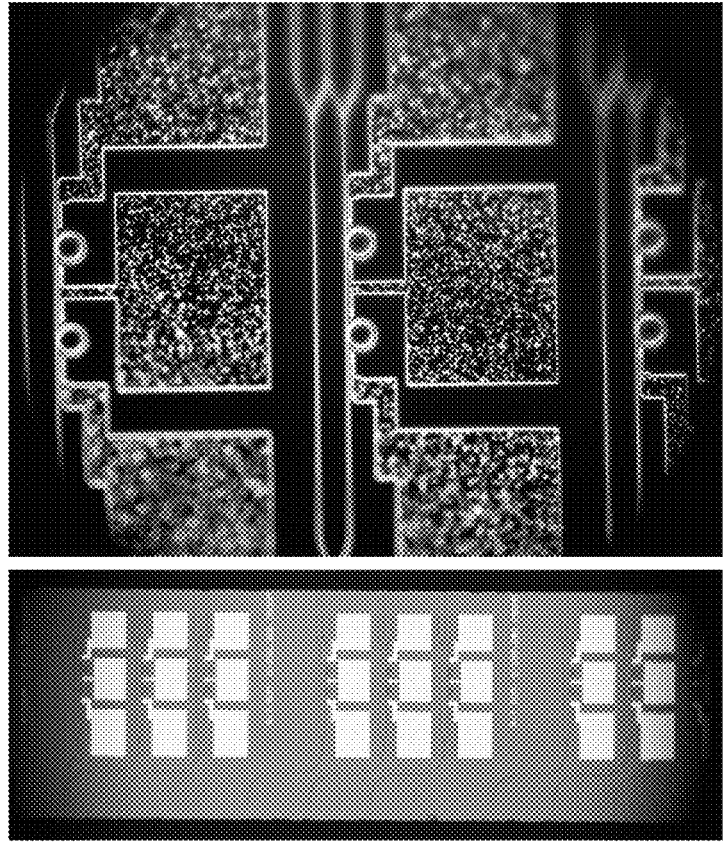
FIG. 13 illustrates fabricated modulators according to one embodiment of the disclosed subject matter.

FIGS. 12(a)-(c) shows an exemplary demonstration of the configuration set forth in FIG. 11(a). FIG. 12(a) is a different view of the same device shown by FIG. 11(a). FIG. 12(b) shows testing of an actual fabricated device based on the design in FIG. 12(a). The measured phase port spectra, FIG. 12(c) shows two dips 1200 reaching zero at each of five resonances, indicating that the input light in the lower MZI arm goes through a 4π phase shift at each resonance. FIG. 13 shows more fabricated devices, with integrated micro-heaters.

In addition to pure phase modulation, the presently disclosed subject matter also contemplates pure amplitude modulation. Micro-resonators are contemplated which, when operated in a critical coupling regime, result in an optical variance from 0 to 1 across the resonance. One potential application of the presently disclosed subject matter is a first micro resonator operating in the critically coupled regime and a second micro resonator operating in the strongly over-coupled regime, which can then provide complete and independent modulation of optical amplitude and optical phase.

Figure 14:
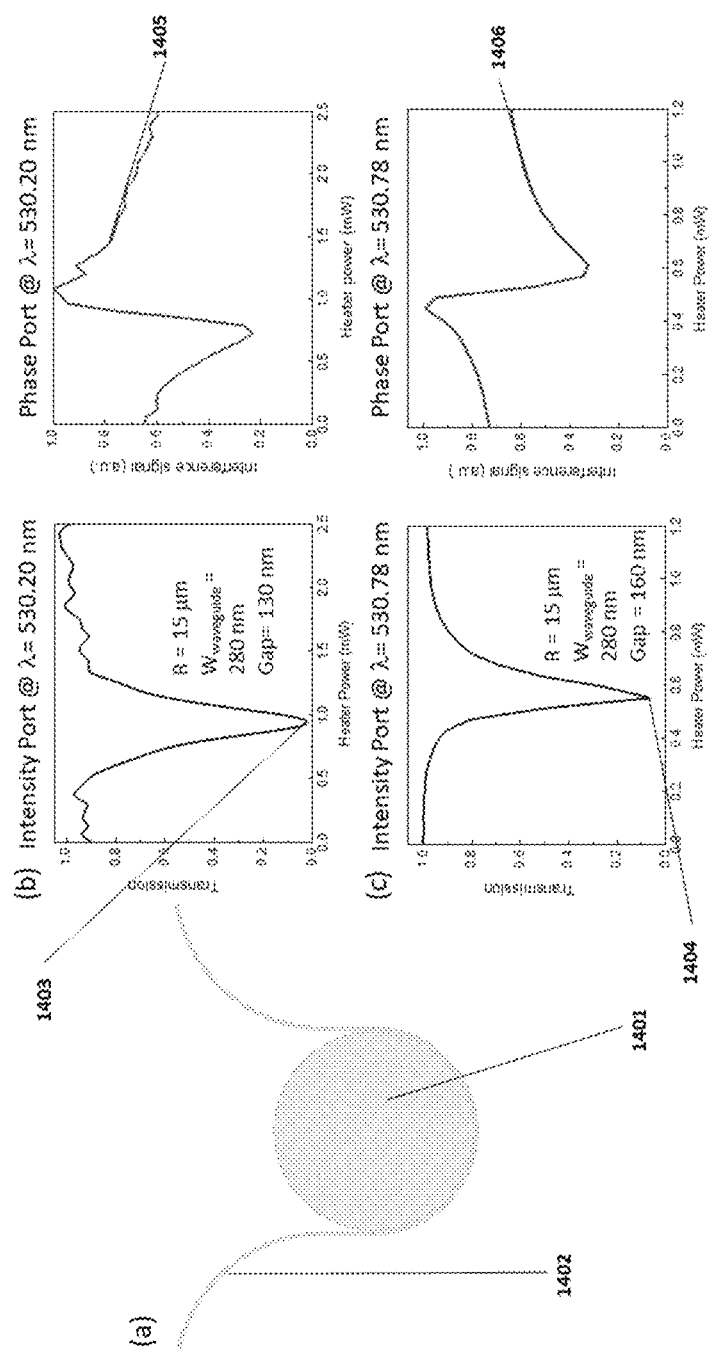
FIGS. 14(a)-(c) illustrate exemplary modulators, according to one embodiment of the disclosed subject matter, operating in the critical coupling regime, with (a) showing a micro-disk resonator a pulley waveguide, (b) showing intensity and phase port responses at 530.20 nm, and (c) showing intensity and phase port responses at 530.78 nm.

FIGS. 14(a)-(c) illustrate an exemplary micro-disk resonator 1401 operating in the critically coupled regime. In this exemplary embodiment, illustrated by FIG. 14(a), a pulley waveguide 1402 wraps around half of the micro-disk resonator 1401. As in previous embodiments, the present embodiment can be affixed to one arm of an MZI circuit, similar to the embodiment of FIG. 3(a). The resulting intensity port spectrums 1403, 1404 show a dip approaching zero for both 530.20 nm 1403 and 530.78 nm 1404. The corresponding phase port spectrums 1405, 1406 show a variation of the intensity between 0.25 and 1, indicating that the resonators operate in the critically coupled regime.

Figure 15:
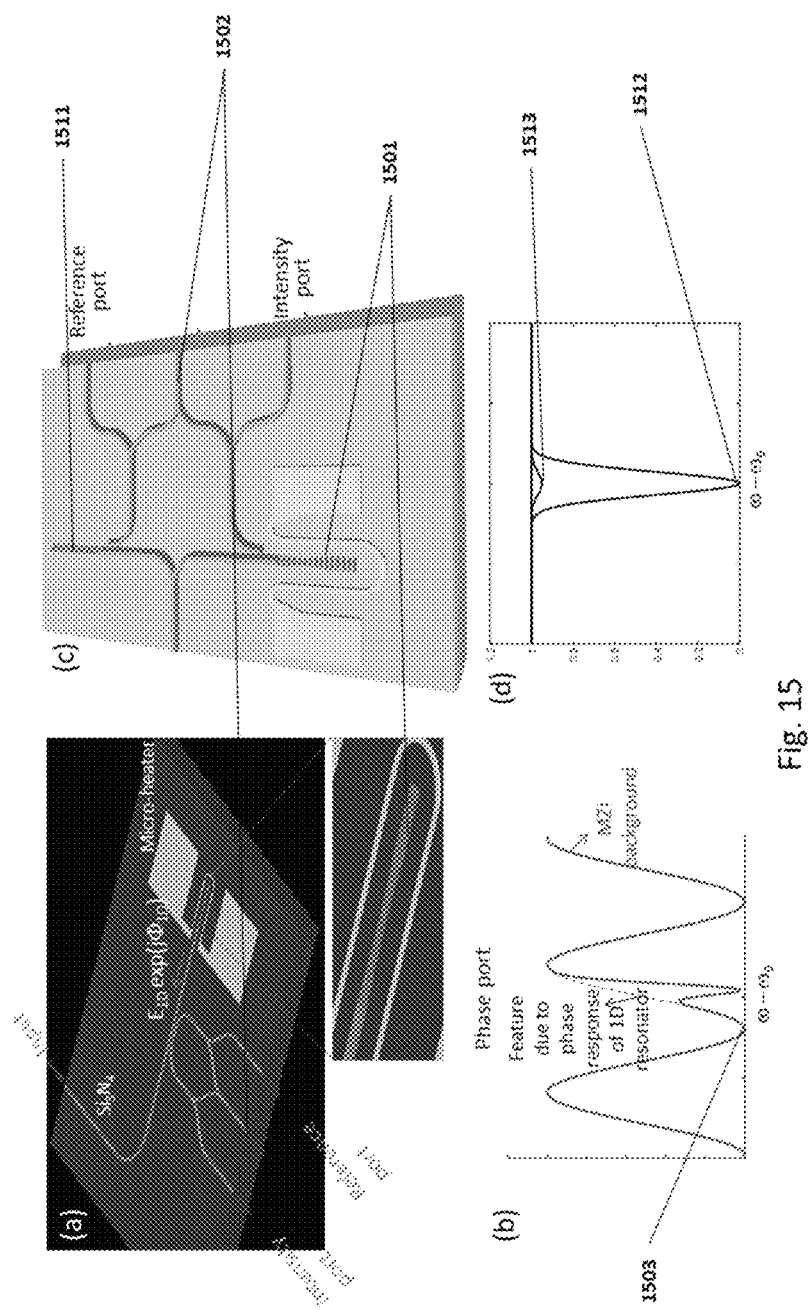
FIGS. 15(a)-(d) illustrate a phase-only modulator based on an over-coupled 1D resonator, with (a) showing design of a 1D photonic crystal resonator, (b) showing simulated phase port response of the device in (a), (c) showing an alternative 1D photonic crystal resonator design, and (d) showing simulated spectra at all output ports of the devices in (c) and (d).

FIG. 15(a) illustrates a 1D photonic crystal resonator 1501 operating in a reflection mode, and which can achieve pure phase modulation. An MZI circuit can be used to monitor the phase and amplitude responses of the 1D resonator. The phase port 1502 receives interferences from two components (1) a quarter of the input signal and (2) a quarter of the reflection from the 1D resonator 1501. Where the 1D resonator 1501 operates in the strongly over-coupled regime, components (1) and (2) have the same amplitude, and so the amplitude variation of (2) is minimal. But the two components are not balanced in the propagation phase, and so the phase port 1502 will show a sinusoidal background 1503. When the two components are π out of phase, there will be a dip reaching zero in the phase port spectrum 1503, which indicates pure phase modulation in this exemplary design. FIG. 15(b) illustrates exemplary phase port response of the system in FIG. 15(a). An improved design, shown by FIG. 15(c) has one arm of the MZI terminate in the 1D resonator 1501 and a second arm terminate in a Bragg reflector (DBR) grating 1511, resulting in the propagation phased of the two arms being balances. Port response from this design, FIG. 15(d), shows pure phase modulation as a dip reaching zero 1512 in the phase port spectrum with a corresponding flat intensity port spectrum 1513.

Figure 16:
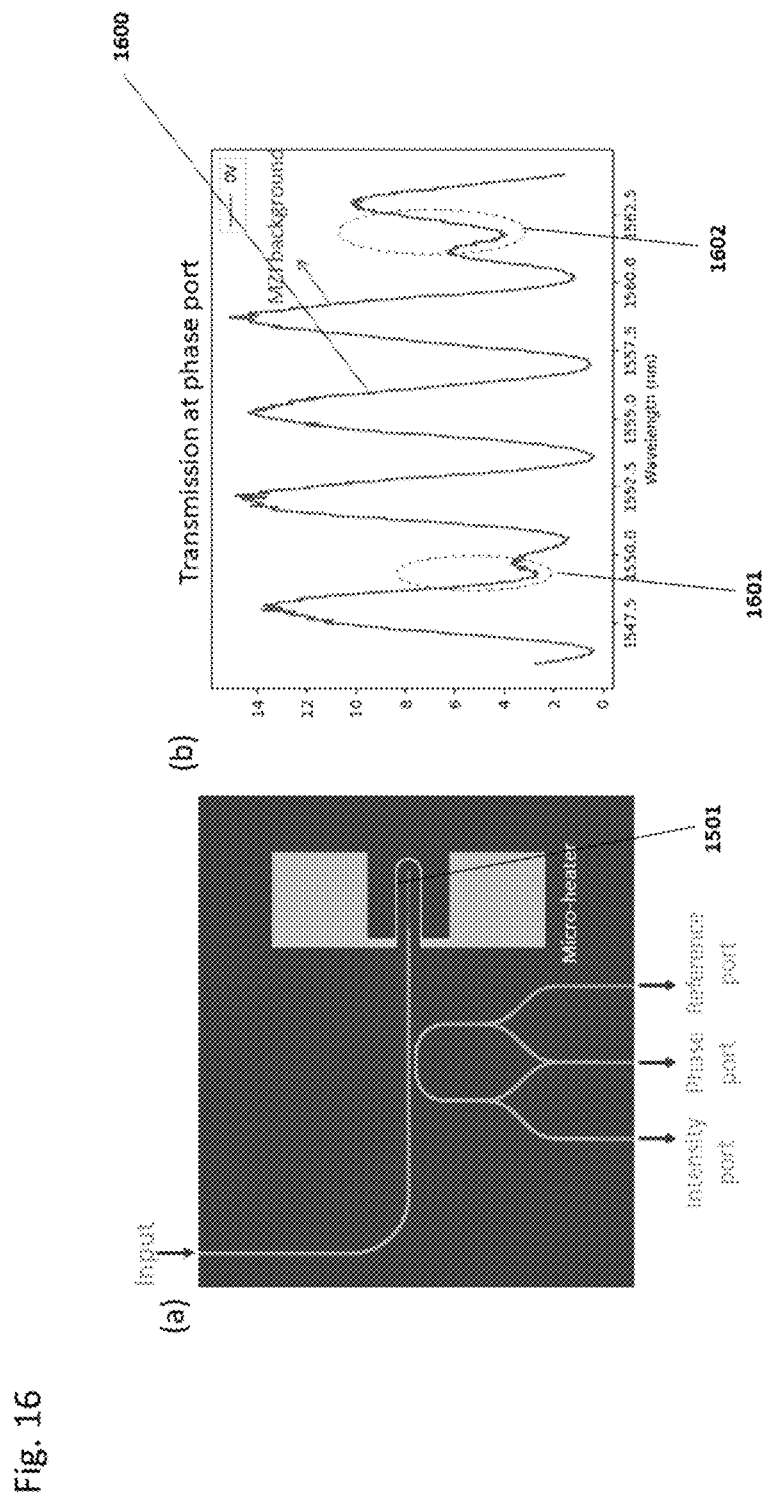
FIGS. 16(a)-(b) illustrate phase modulation in a 1D photonic crystal resonator, according to one embodiment of the disclosed subject matter, with (a) showing an exemplary design of a 1D photonic crystal resonator embedded within an MZI, and (b) showing measured spectrum at the phase port.
Figure 17:
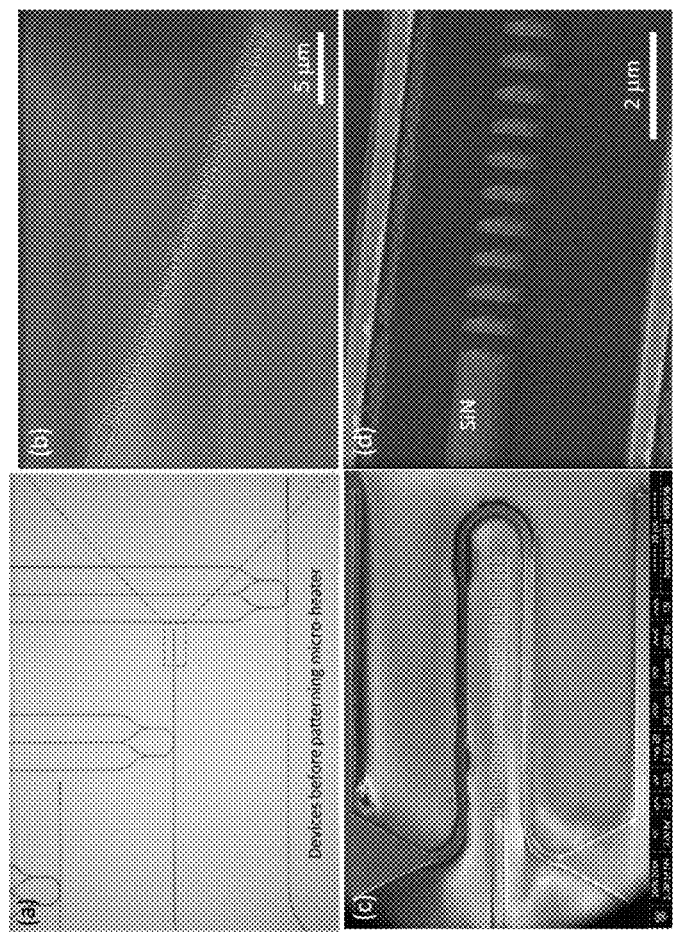
FIGS. 17(a)-(d) illustrate fabricated $Si_3N_4$ 1D modulators working in a telecom wavelength range.

The predicted results of the embodiment of FIG. 15(a) are illustrated by FIG. 16(b). FIG. 16(a) again shows the exemplary device of FIG. 15(a). The measured spectrum 1600 shows a first order resonance 1601 and a second order resonance 1602. The first order resonance 1601 can be caused by excitation of the fundamental longitudinal mode of the 1D resonator 1501, that is a mode with one lobe along the length of the resonator 1501. The second order resonance 1602 can be caused by excitation of a second-order longitudinal mode of the 1D resonator 1501, that is, a mode with two lobes along the length of the resonator 1501.

Figure 18:
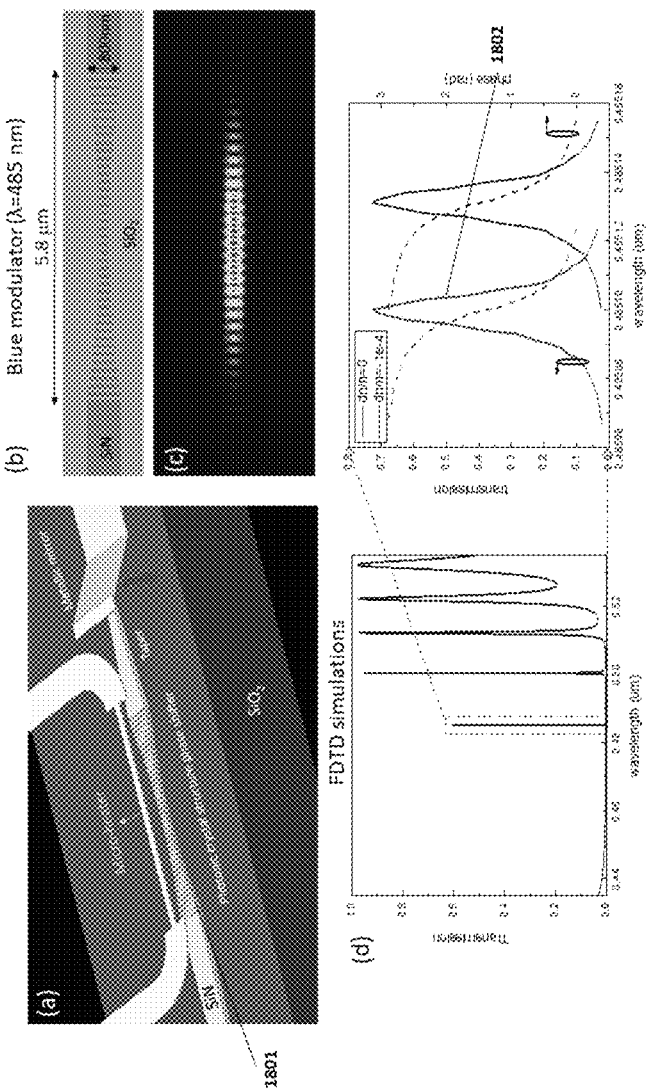
FIGS. 18(a)-(d) illustrate modulators based on 1D resonators working in the visible spectral range, according to one embodiment of the disclosed subject matter, with (a) showing an exemplary design of a 1D modulator operating in the visible range, (b) showing a top view of the device in (a), (c) showing simulated resonance of the device in (a), and (d) showing transmission spectrum of the device in (a).
Figure 19:
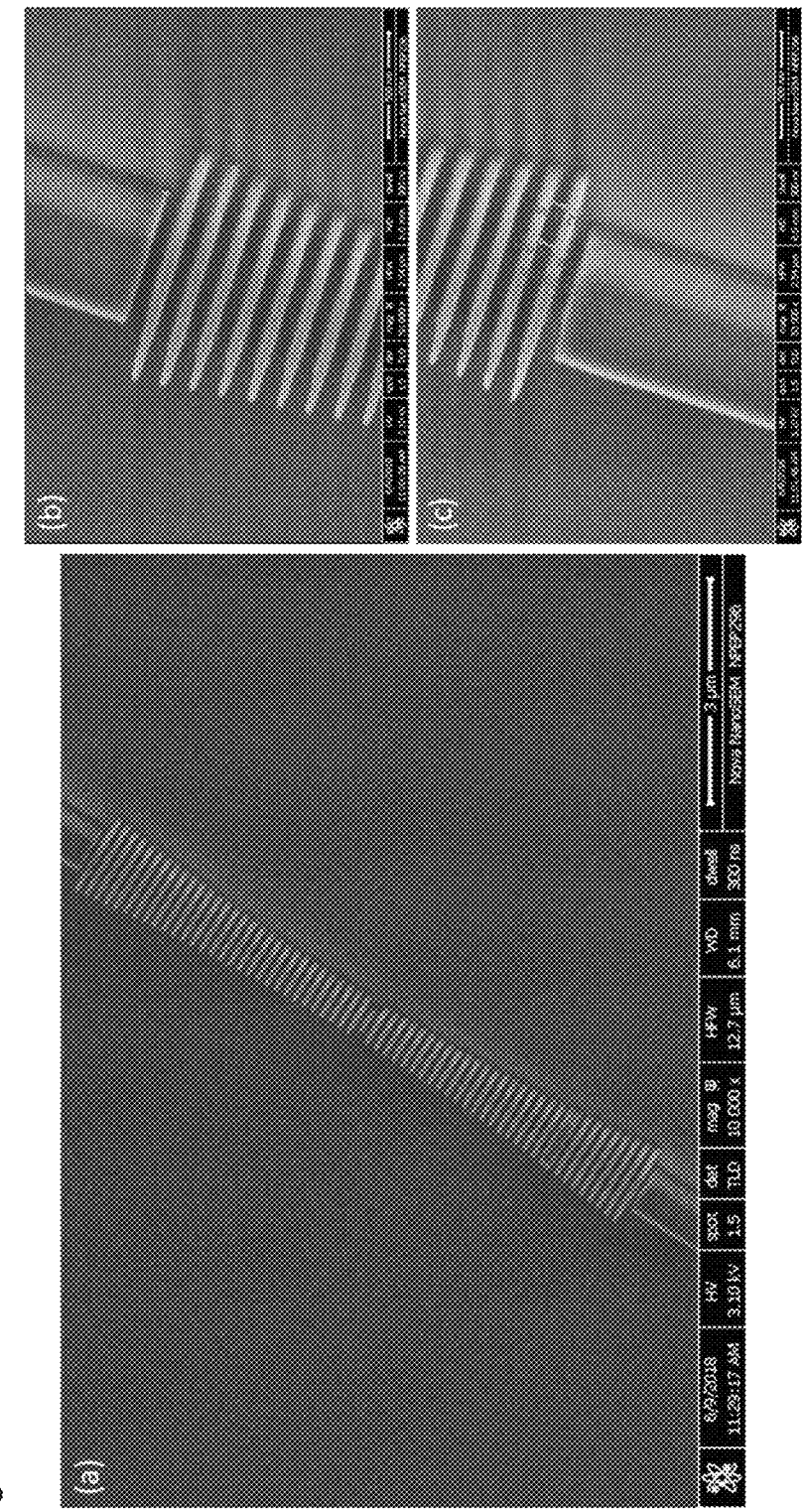
FIGS. 19(a)-(c) illustrate fabricated 1D modulators working in the visible spectral range, according to one embodiment of the disclosed subject matter, with (a) showing an SEM view of the entire fabricated device, (b) showing various widths of the fabricated device, and (c) showing various lengths of the fabricated device.

FIG. 18(a) illustrates an optical modulator designed based on 1D resonators in the visible spectral range 1801. This exemplary device has a length of 5.8 µm and can achieve amplitude and phase modulation, as illustrated in FIG. 18(d), which measures the transmission response of the device over a range of wavelengths. The resonance has an appreciable blue shift 1802 in wavelength when the effective refractive index of the resonator is reduced by 10', which can lead to significant changes to optical amplitude and phase. A view of the device from above is shown by FIG. 18(b), with resonance modes shown in FIG. 18(c).

Figure 20:
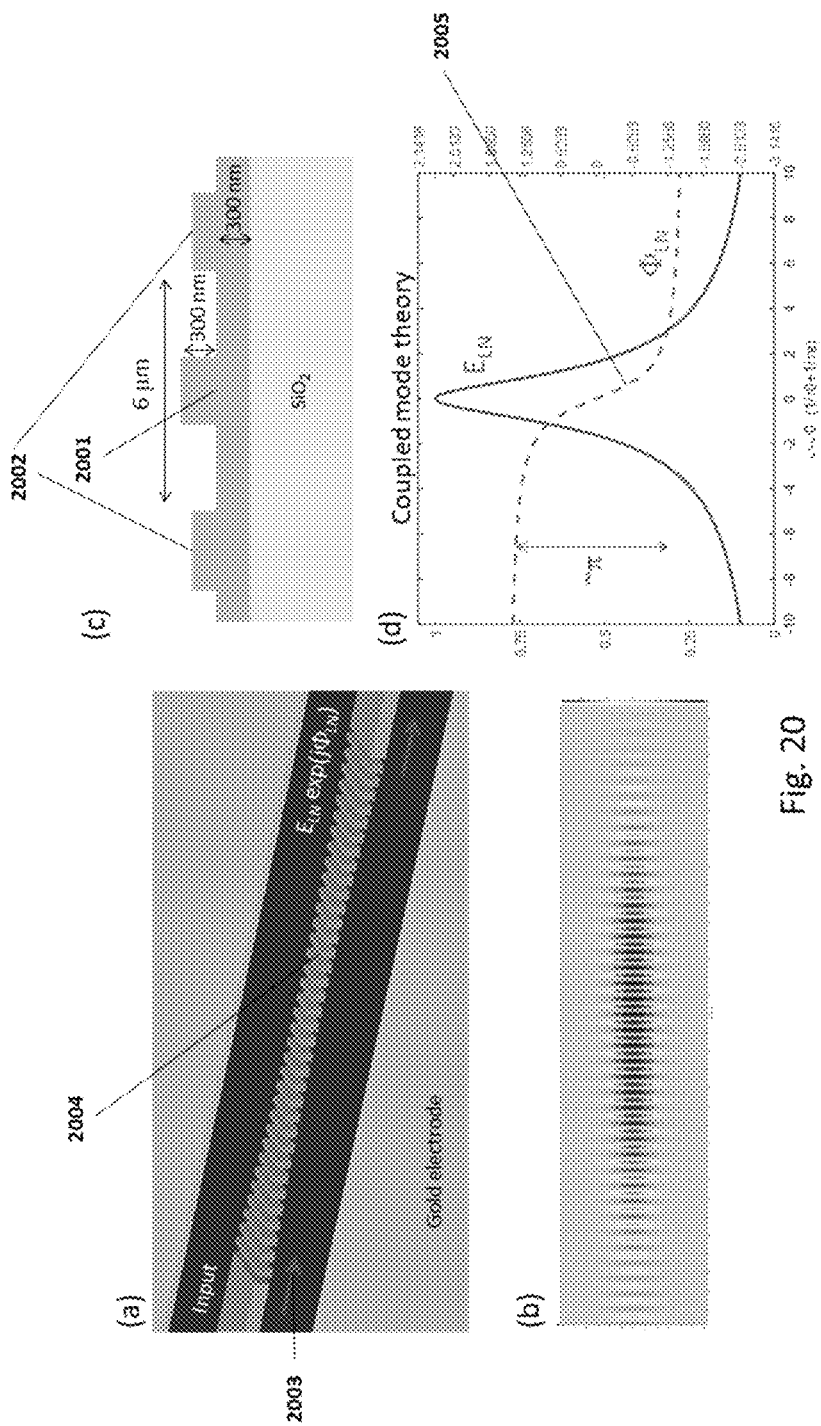
FIGS. 20(a)-(d) illustrate an exemplary modulator based on 1D Lithium Niobate photonic crystal resonators working in the telecom wavelength range with (a) showing a schematic of the device, (b) showing a simulated resonance mode of the device, (c) showing a transverse cross-sectional view of the device, and (d) showing optical resonance response.

FIGS. 20(a) and (c) illustrate a modulator design based on 1D Lithium Niobate ($LiNbO_3$) 2001, capable of working in a telecom wavelength range. In this exemplary embodiment, illustrates by the cross sectional view in FIG. 20(c), the 1D resonator 2004 is etched from a thin film of Lithium Niobate 2001, which is positioned between a pair of electrodes 2002. In this embodiment, the electrodes are composed of gold, however, the presently disclosed subject matter contemplates electrodes made of any suitable material known in the art. A control voltage can be applied between the electrodes 2002 which produces an in-plane electric field in the transverse direction with respect to the light propagation direction in the device 2003. This electric field can induce a small change in the refractive index of the Lithium Niobate 2001 via the electro-optical effect. This can result in modulation 2005 of light transmitted through the device, illustrated by FIG. 20(d). This exemplary device can provide very high modulation speed, for example greater than 1 GHz. The optical resonance response of the device 2004 is shown by FIG. 20(b).

In recent years, lithium niobate has become a viable platform for integrated photonics. Single-crystal lithium niobate thin films with, for example, 300 nm and 1 µm in thickness, about 3 inches in size, and with a low density of impurities and vacancies are now commercially available. Further, MgO-doping and "optical cleaning" have drastically improved the optical damage threshold of lithium niobate, enabling an integrate lithium niobate platform to carry high optical power up to 1000 $W/cm^2$. Novel cleanroom recipes can be used to nanostructure lithium niobite, resulting in the devices illustrated in FIGS. 21(a)-(c). These exemplary etching recipes can define deeply subwavelength features (as small as 50 nm) in lithium niobate thin films, allowing fabrication of miniature telecom and visible electro-optic modulates based on lithium niobite thing films on silicon dioxide ($SiO_2$).

Figure 21:
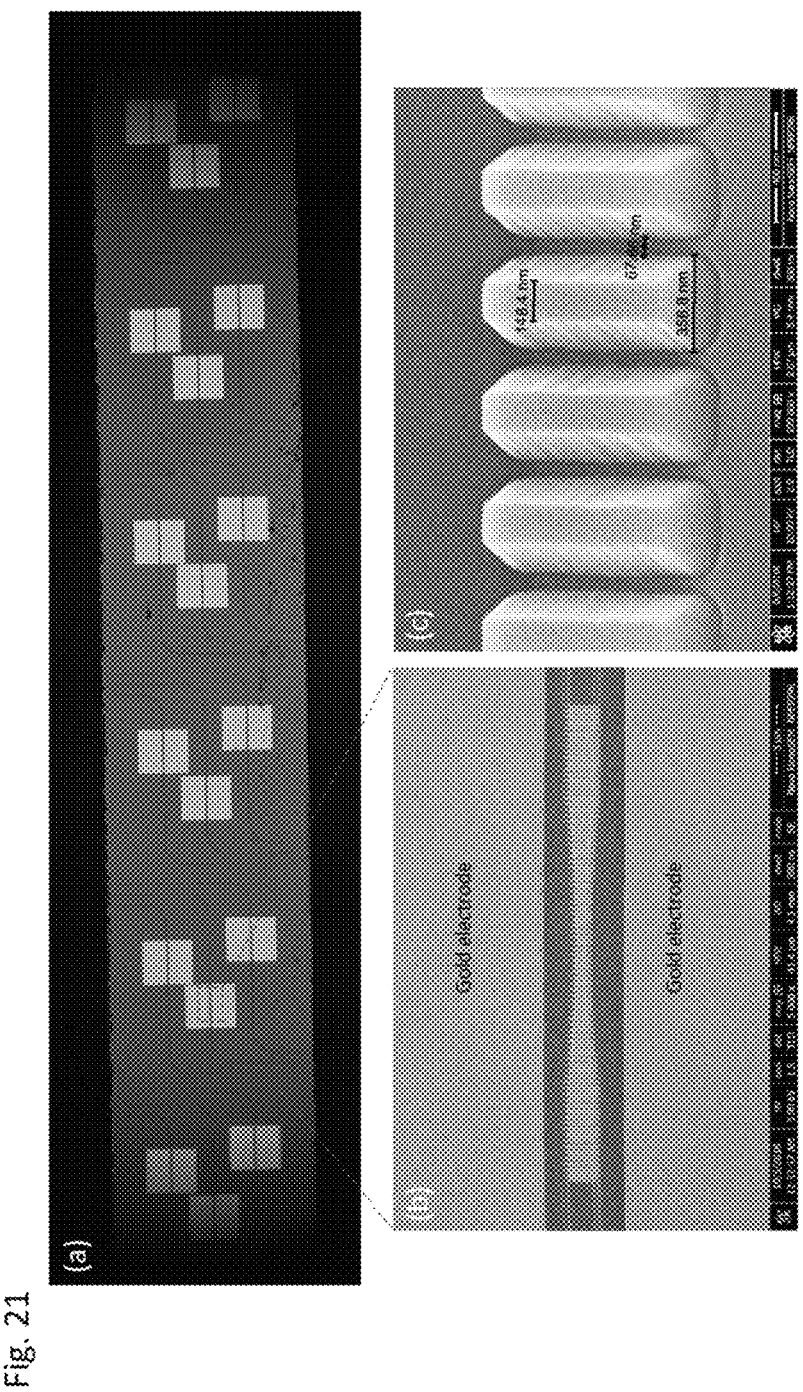
FIGS. 21(a)-(c) illustrate fabricated 1D $LiNbO_3$ (Lithium Niobate) optical modulators, according to one embodiment of the disclosed subject matter, with (a) showing multiple fabricated devices on a single platform, (b) showing an enlarged photo of a single 1D photonic resonator, and (c) showing the widths of individual components of an exemplary 1D photonic resonator.
Figure 22:
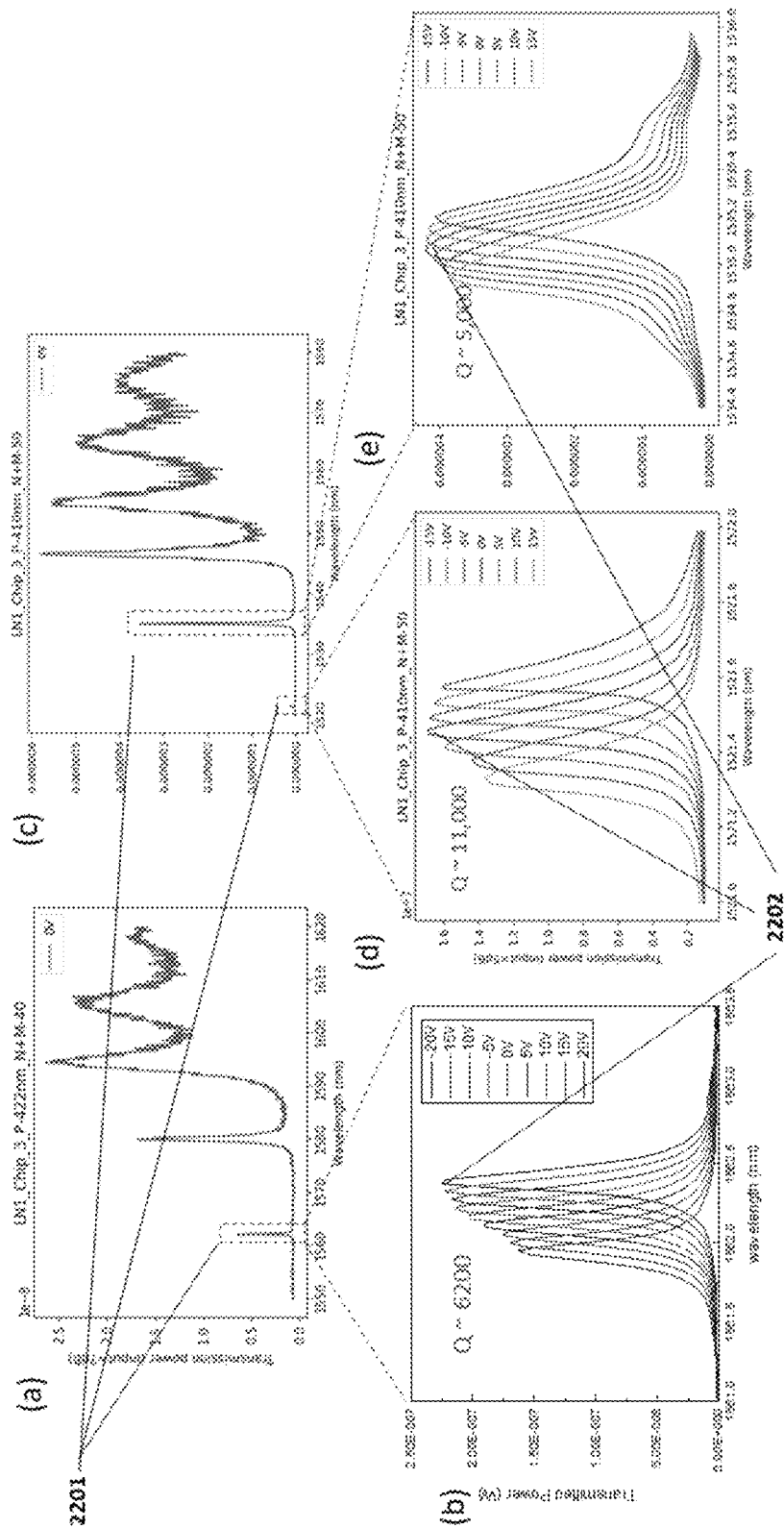
FIGS. 22(a)-(e) illustrate amplitude modulation in 1D Lithium Niobate optoelectronic modulators, with (a) showing overall transmission spectrum of one exemplary device, (b) an enlarged graph of the resonance highlight in (a), (c) showing measured overall transmission spectrum of a second exemplary device, (d) showing an enlarged graph of the first resonance highlighted in (c), and (d) showing an enlarged graph of the second resonance highlighted in (c).

The presently disclosed subject matter contemplates integration of the 1D modulator design of FIG. 20(a) onto the integrated lithium niobate structure of FIG. 21(b). The result of testing such devices is illustrated in FIGS. 22(a)-(e). The overall transmission spectra, illustrated in FIGS. 22(a) and (c) of the devices showed transmission resonance peaks 2201. These peaks are further enlarged in FIGS. 22(b), (d), and (e). The first order and second order resonances that have sufficiently large Q factors show significant shifts when the control voltage is tuned 2202. Control voltage can be reduced from ±15-20 V to about ±5 V by placing the pair of electrodes 2002 beside the 1D resonator 2004 closer to each other or using 1D resonators that can support higher Q factors. The results shown in FIGS. 22(a) and (c) represent the first time that miniature electro-optical modulators have been demonstrated on an integrated lithium niobate platform.

Figure 23:
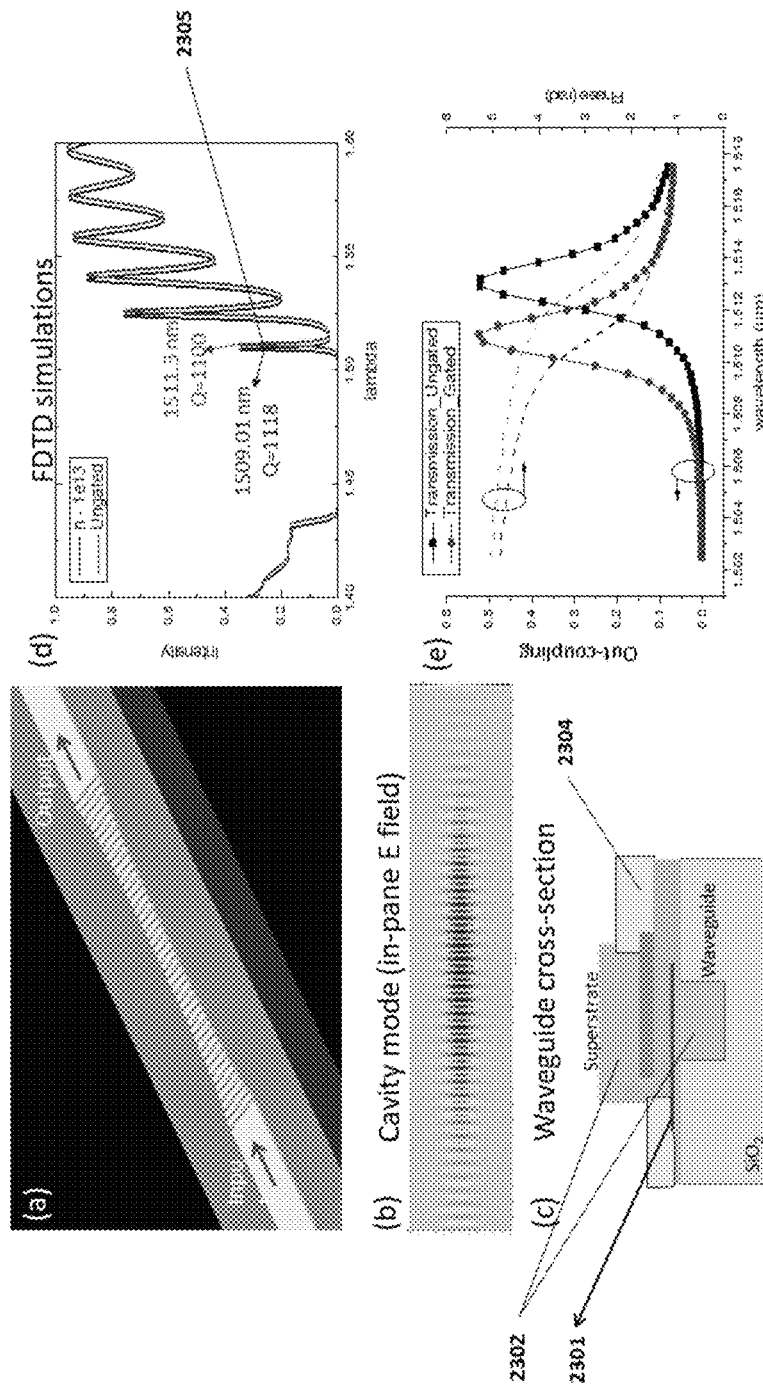
FIGS. 23(a)-(e) illustrate optical modulators based on a 1D resonators and a $WS_2$ (Tungsten Disulfide) monolayer, according to one embodiment of the disclosed subject matter, with (a) showing an exemplary device design, (b) showing a simulated resonance mode of the device in (a), (c) showing a transverse cross-sectional view of the device in (a), (d) showing transmission spectra of the device in (a) with changing carrier concentration, and (e) showing an enlarged graph as in (d).

A further embodiment of the presently disclosed subject matter contemplates a 1D modulator design based on integrated silicon nitride ($Si_3N_4$) and transition metal dichalcogenide (TMD) monolayers. Such a design is illustrated, for the purpose of example and not limitation, in FIGS. 23(a) and (c). In this embodiment, a cross sectional view of which is shown in FIG. 23(c), a TMD monolayer composed of tungsten disulfide ($WS_2$) 2301, placed near a 1D photonic crystal resonator 2302. A voltage can be applied between the TMD monolayer 2301 and a top electrode 2304 changes the carrier concentration on the TMD monolayer 2301, which leads to a change of its complex refractive index and thus a modulation of the optical signal transmitted through the device 2305. In addition, carrier charge concentration can be altered in the TMD monolayer 2301, with the effects being illustrated by FIG. 23(d). An enlarged image of one peak 2305 is shown in FIG. 23(e), with phase shift and out-coupling across the resonance shown.

Figure 24:
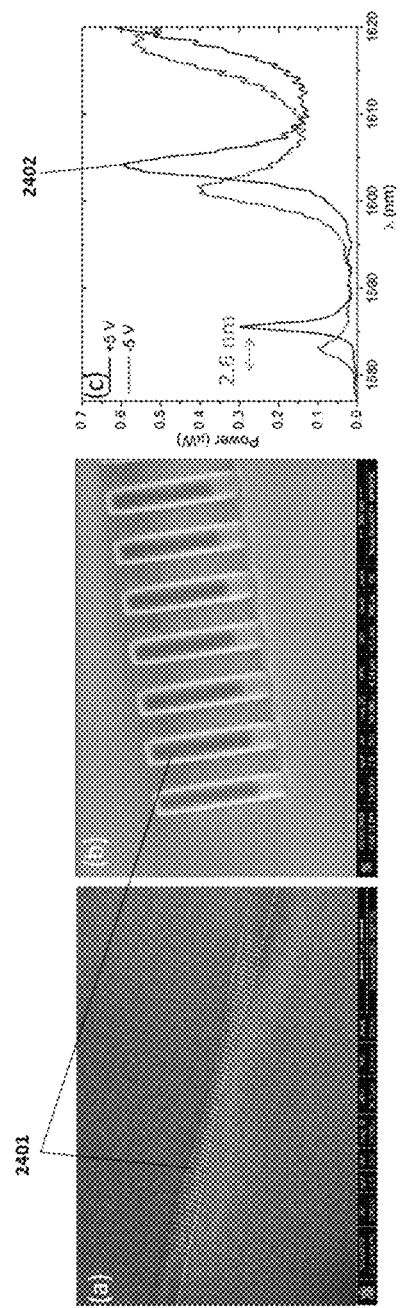
FIGS. 24(a)-(c) illustrate exemplary optical modulators based on a 1D resonator and a Tungsten Disulfide monolayer, with (a) showing a 1D resonator on a tungsten disulfide layer, (b) showing a close up view of one element of the device in (a), and (c) showing transmission spectra of the device in (a) at two control voltages.
Figure 25:
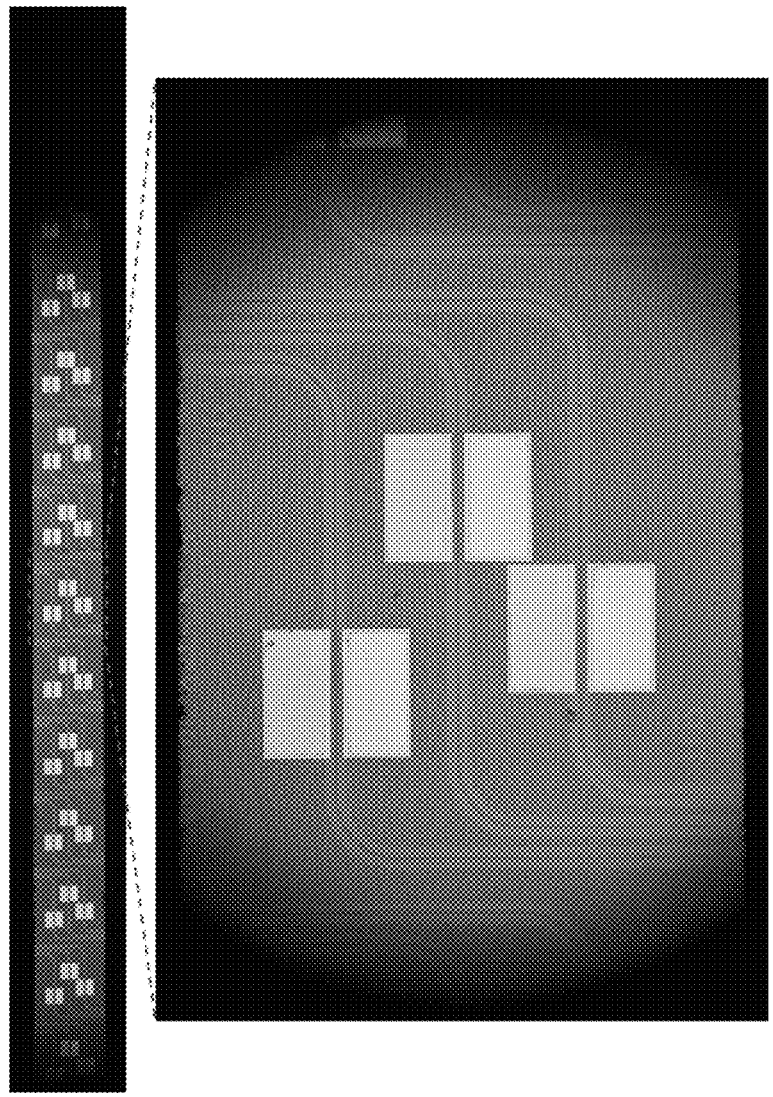
FIG. 25 illustrates fabricated optical modulators based on a 1D resonator and a Tungsten Disulfide monolayer.

FIGS. 24(a)-(c) illustrate the use of a 1D modulator based on the design in FIG. 23(c), of an integrated silicon nitride platform and a tungsten disulfide monolayer. Measured transmission spectra for this exemplary device 2401 shows large amplitude modulation 2402 when the control voltage changes from +5 V to −5 V. Fabricated devices using the presently disclosed design are illustrated in FIG. 25.

Figure 26:
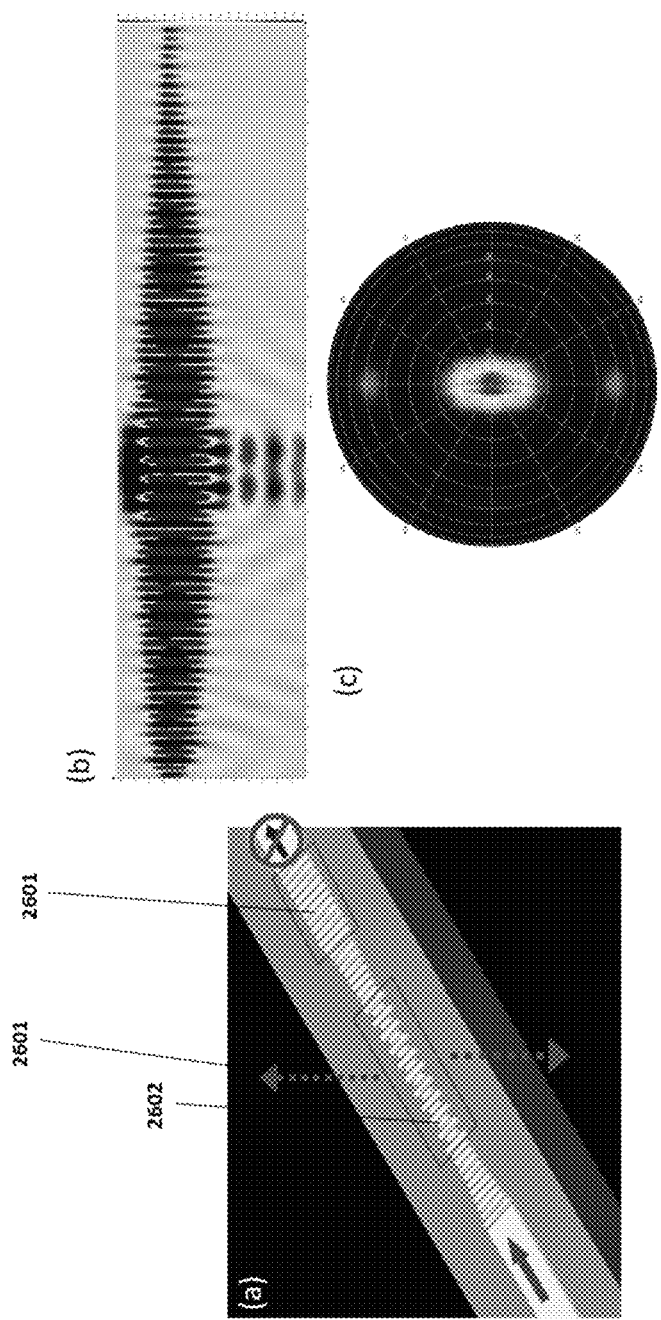
FIGS. 26(a)-(c) illustrate a 1D modulator with vertical out-couplers, according to one embodiment of the disclosed subject matter, with (a) showing an exemplary design for a device with out-couplers, (b) showing simulation of field distribution around the device in (a), and (c) showing simulated far-field distribution at the surface normal direction to the device in (a).

In certain disclosed embodiments, the 1D photonic crystal resonator modulates the in-line transmission through the exemplary devices. The presently disclosed subject matter also contemplates directing the modulated light into free space without additional out-couplers, such a device is illustrated in FIG. 26(a). This outcoupling effect 2603 can be achieved by blocking the in-line transmission with a distributed Bragg reflector (DBR) segment 2601 and introducing a perturbation in the 1D resonator. One exemplary method to achieve such perturbation is by introducing a second order grating 2601, which can scatter modulated light upward and downward with minimal transmission and reflection. The device can thus serve simultaneously as an amplitude modulator and a vertical out-coupler. Unidirectional emission can be obtained if a metallic mirror is used to reflect one of the two beams into the opposite direction. FIG. 26(b) shows simulated field distribution around the device 2602, and FIG. 26(c) shows simulated far-field distribution at the surface normal direction to the device 2602.

Figure 27:
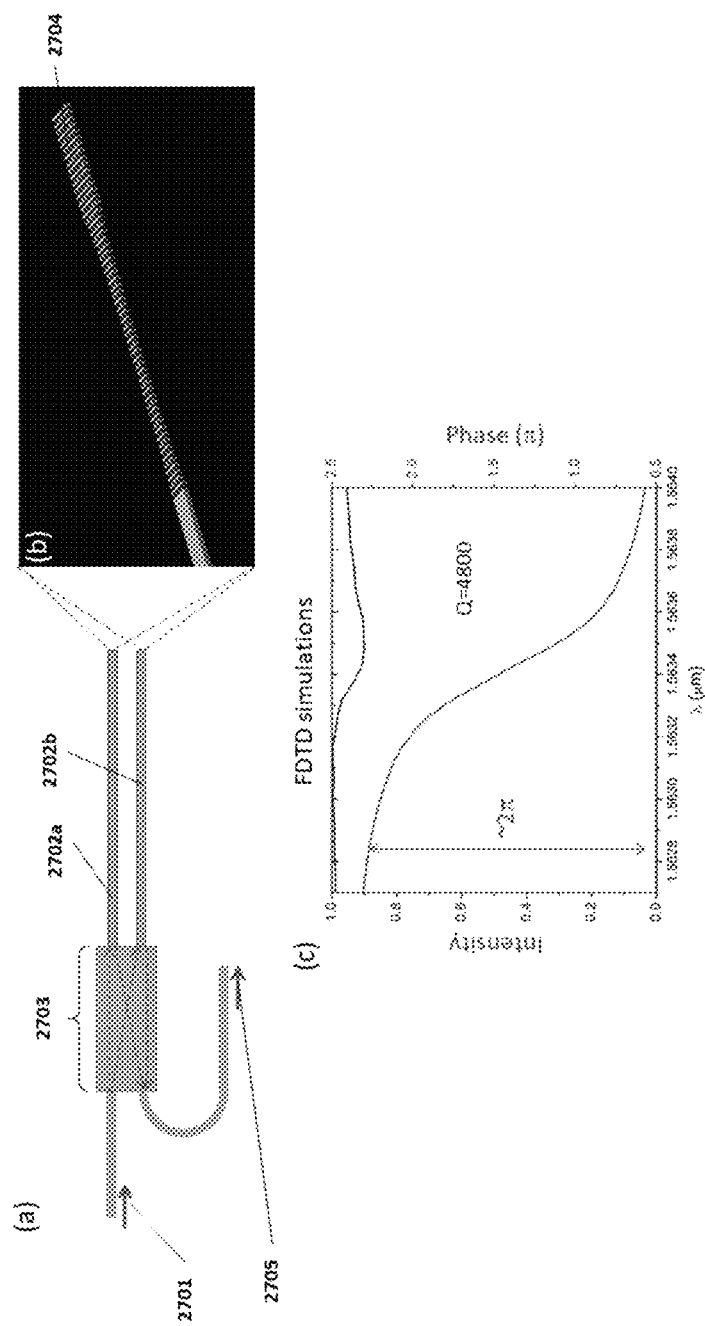
FIGS. 27(a)-(c) illustrate a small insertion loss, phase-only 1D modulator based on dual photonic-crystal resonators, according to one embodiment of the disclosed subject matter, with (a) showing an exemplary schematic of a device, (b) showing the end of each of the 1D resonators in (a), and (c) showing full-wave simulations showing pure phase modulation of the device in (a).

Pure phase modulation with zero insertion losses can be realized in 1D modulators using a device configuration illustrated in FIG. 27(a). An input mode 2701 couples into a pair of identical and closely space 1D photonic crystal resonators 2702a, 2702b a multimode interference (MMI) device 2703. The two 1D resonators 2702a, 2702b can share the same control voltage or micro-heaters so that they can be modulated to the same degree. The 1D resonators 2702a, 2702b are terminated with DBR gratings, illustrated in FIG. 27(b), so that together they produce two modulated reflected light waves that constructively interfere to couple all optical power into an output port 2705. If the strongly over-coupled condition is satisfied, that is, the coupling rate of light into a resonator is much larger than the decay rate due to the combination of the scattering and absorption losses in the resonator, the output signal will have a a modulation and minimal amplitude variation across an optical resonance, as shown by FIG. 27(c). Similar to the embodiment of FIG. 11(a), which made use of two cascading micro-rings, two 1D modulators can be cascaded so that the total phase shift across one optical resonance will be 4π, and can operate at the relatively linear a region of the phase profile.

Figure 28:
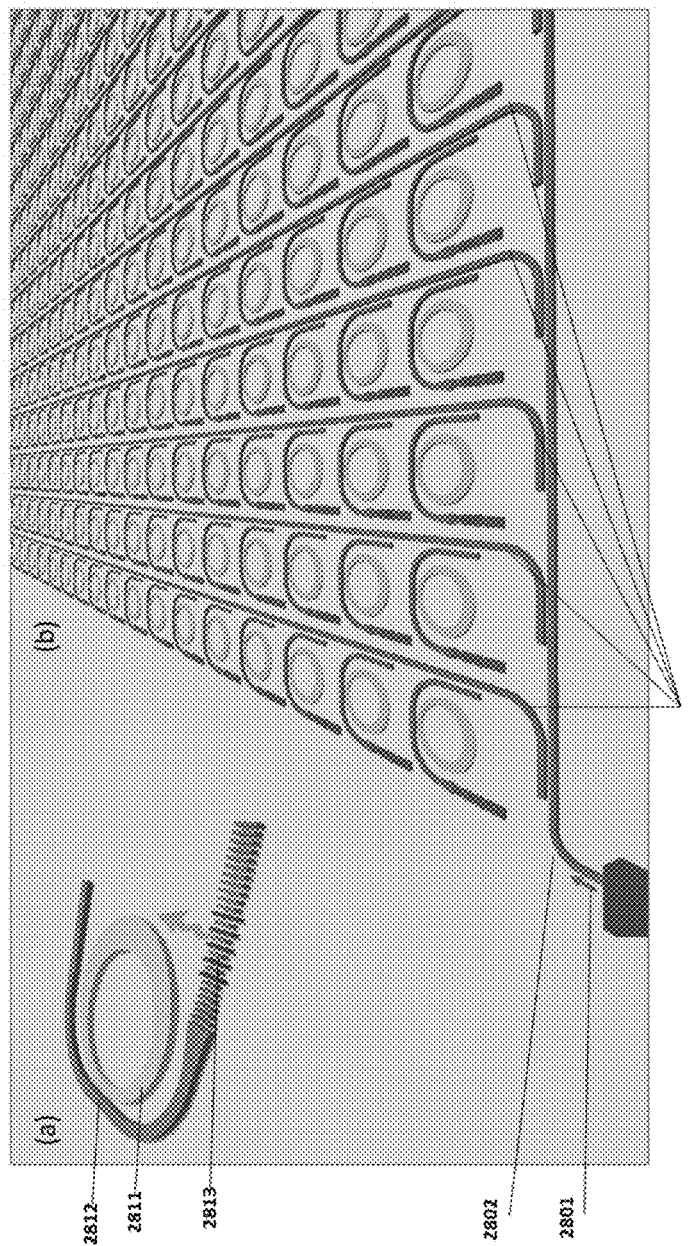
FIGS. 28(a)-(b) illustrate a 2D spatial light modulator, according to one embodiment of the disclosed subject matter, with (a) showing a schematic pixel of the spatial light modulation, and (b) showing a 2D spatial light modulator consisting of a 2D array of the pixel shown in (a).

FIG. 28(b) illustrates an exemplary spatial light modulator which can provide complete independent control of optical phase and amplitude at each pixel, created by integrating the optical modulators of the previous embodiments into a 2D array. Laser emission 2801 can be coupled into a main silicon nitride waveguide 2802 and then evanescently coupled into an array of row waveguides 2803. The coupling of the row waveguides 2803 can be controlled in such a way (for example and not limitation, by varying the length of the directional coupler, so that each row waveguide 2803 obtains the same amount of optical power from the main waveguide 2802. The optical power in each row waveguide 2803 is then similarly divided into individual pixels 2810, so that all the pixels 2810 are uniformly excited. Each pixel, an example of which is shown in FIG. 28(a), comprises a pure phase modulator 2811 (for example but not limitation, an adiabatic ring resonator) and an amplitude modulator 2812 (for example but not limitation, a 1D photonic crystal resonator that also functions as a vertical out-coupler 2813). A control electronic circuit (not pictured) can be integrated onto the same chip, on the sides surrounding the 2D array or on a separate layer underneath the 2D array, to control the phase and amplitude responses of each pixel.

Figure 29:
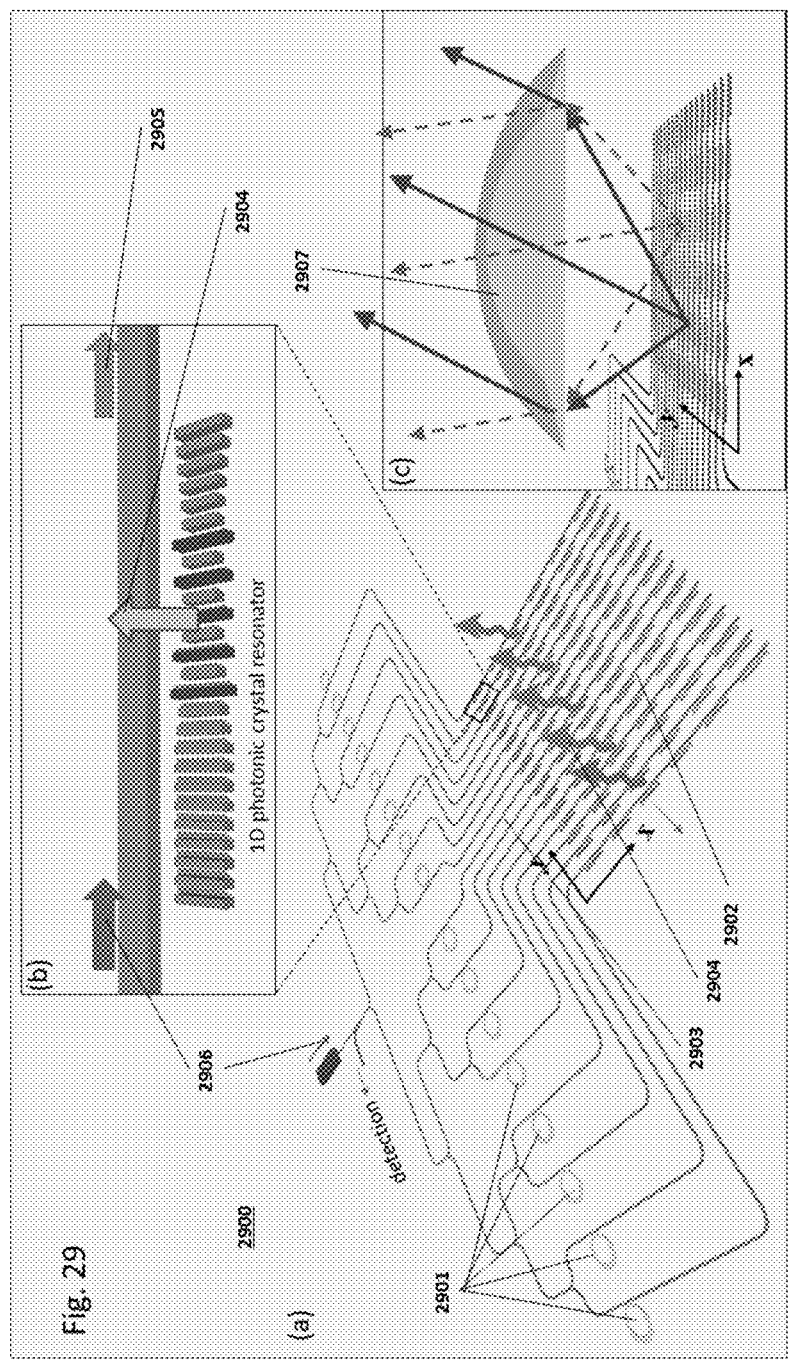
FIGS. 29(a)-(c) illustrates a light detection and ranging (LIDAR) system, according to one embodiment of the disclosed subject matter, with (a) showing a phased array of micro-ring resonators, (b) showing how beam steering is achieve in the x direction by 1D crystal modulators, and (c) showing a cylindrical lens above the array which can interact with out-coupled light from (b).

The presently disclosed subject matter also contemplates a light detection and ranging (LIDAR) system composed of optical micro-resonators. FIG. 29(a) illustrates one exemplary embodiment of such a system 2900. In this design, beam steering in the y direction is controlled by a phased array of micro-ring resonators 2901 operating in the strongly over-coupled regime; beam steering in the x direction is controlled by an array of 1D photonic crystal modulators 2902 that are side-coupled to waveguides 2903. If a 1D modulator is tuned to be on resonance with the wavelength of the incoming light 2906, it will resonantly scatter the light vertically out with little in-line transmission and reflection 2904; otherwise, when the antenna is off resonance with the incoming light 2906, the light will pass through the waveguide with high transmission 2905, the principle of which is illustrated in FIG. 29(b). The 1D photonic crystal modulators 2902 are identical in each column along the y direction while their resonance wavelengths are slightly different in the x direction. Therefore, by bringing one column of the 1D modulators 2902 on resonance (for example but not limitation, by using the electro-optical effect or thermo-optical effect) each time, one can selectively light up this column. A cylindrical lens 2907, shown in FIG. 26(c) can be place above the array of 1D photonic crystal modulators 2902 (with the symmetry axis of the cylindrical lens along the y direction), the emission from different columns of the 1D modulators 2902 at different x positions will translate to different emission angles of the beam in the far field 2904. In this way, independent control of the beam in both x and y directions can be achieved, enabling efficient and rapid steering of the emitted light beam.

Furthermore, the system 2900 can be used in a receiver mode. The angular positions along the x and y directions of the incoming beam that can be detected are determined, respectively, by the specific column of the 1D photonic crystal resonators that is tuned to be on resonance with the frequency of the incoming light, and the phase gradient used by the array of micro-ring resonators. It is further contemplated that the system 2900 can be used as a light projector or a spatial light modulator, which generates a desired output beam but does not collect incoming light.

In addition to the various embodiments depicted and claimed, the disclosed subject matter is also directed to other embodiments having other combinations of the features disclosed and claimed herein. As such, the particular features presented herein can be combined with each other in other manners within the scope of the disclosed subject matter such that the disclosed subject matter includes any suitable combination of the features disclosed herein.

The foregoing description of specific embodiments of the disclosed subject matter has been presented for purposes of illustration and description. It is not intended to be exhaustive or to limit the disclosed subject matter to those embodiments disclosed.

It will be apparent to those skilled in the art that various modifications and variations can be made in the methods and systems of the disclosed subject matter without departing from the spirit or scope of the disclosed subject matter. Thus, it is intended that the disclosed subject matter include modifications and variations that are within the scope of the appended claims and their equivalents.

What is claimed is:

1. A system for producing pure phase modulation of an input light wave comprising:
   a curved waveguide for receiving the input light wave;
   a micro-resonator coupled to at least a portion of the curved waveguide, wherein a gap of at least about 150 nm exists between the micro-resonator and the curved waveguide and the micro-resonator has a length or a radius of at least 15 μm and is configured to produce pure phase modulation of the input light wave by operating in a strongly over-coupled regime;
   a signal tuner proximate to the micro-resonator, wherein the signal tuner is adapted to alter a refractive index of the micro-resonator; and
   an output, coupled to the micro-resonator to output the purely phase modulated light.

2. The system of claim 1, wherein the signal tuner is a micro-heater adapted to alter the refractive index of the micro-resonator through a thermo-optical effect.

3. The system of claim 1, wherein the signal tuner is a pair of micro-electrodes adapted to alter the refractive index of the micro-resonator through an electro-optical effect.

4. The system of claim 1, wherein the micro-resonator is a 1D photonic crystal, wherein the input light wave is reflected by a cavity of the 1D photonic crystal to produce pure phase modulation.

5. The system of claim 1, wherein the micro-resonator is a micro-ring evanescently coupled to the curved waveguide and configured to operate in a strongly over-coupled regime.

6. The system of claim 5, wherein the micro-ring is an adiabatic ring, wherein
   a narrow portion of the ring is located adjacent to the portion of the curved waveguide to which the resonator is coupled for strong coupling between the micro-ring and the waveguide;
   a wide portion of the ring is located some distance from the waveguide and is configured to reduce scattering losses from roughness of a sidewall of the micro-ring.

7. The system of claim 1, wherein the micro-resonator is a micro-disk.

8. The system of claim 1, wherein the waveguide is coupled to the micro-resonator by wrapping a portion of the waveguide around the micro-resonator.

9. The system of claim 1, wherein the micro-resonator comprises a plurality of subordinate micro-resonators arranged in arrays.

10. The system of claim 1, wherein the micro-resonator is composed of material selected from the group consisting of silicon, germanium, silicon nitride, aluminum nitride, silicon dioxide, lithium niobate, diamond, and compound semiconductors.

11. The system of claim 1, wherein the curved waveguide is a pulley waveguide, extending around a majority of the circumference of the micro-resonator.

12. A system for producing phase and amplitude modulation of an input light wave comprising:
   a fixed-curved waveguide for receiving the input light wave;
   a first micro-resonator coupled to at least a first portion of the curved waveguide, wherein a gap of at least about 150 nm exists between the micro-resonator and the curved waveguide and the micro-resonator has a length or a radius of at least 15 μm and is and configured to produce pure phase modulation of the input light wave by operating in a strongly over-coupled regime;
   a second micro-resonator coupled to at least a second portion of the curved waveguide and configured to produce pure amplitude modulation of the input light wave by operating in a critically coupled regime;
   a plurality of signal tuners proximate to each of the first and the second the micro-resonators, wherein the plurality of signal tuners are adapted to alter a refractive index of the first and the second micro-resonators; and
   an output, coupled to the micro-resonators to output the phase and amplitude modulated light.

13. The system of claim 12, wherein the signal tuner is a micro-heater adapted to alter the refractive index of the micro-resonator through a thermo-optical effect.

14. The system of claim 12, wherein the signal tuner is a pair of micro-electrodes adapted to alter the refractive index of the micro-resonators through an electro-optical effect.

15. The system of claim 12, wherein the micro-resonator is a 1D photonic crystal.

16. The system of claim 15, wherein the 1D photonic crystal is further configured to direct the modulated light wave into free space, wherein the 1D photonic crystal comprises a perturbation in the 1D photonic crystal.

17. The system of claim 16, wherein the perturbation in the 1D photonic crystal comprises a second order grating which scatters the modulated light wave in a direction perpendicular to an in-line transmission direction of the input light wave.

18. The system of claim 12, wherein the micro-resonator comprises a plurality of subordinate micro-resonators arranged in arrays.

19. The system of claim 12, wherein the micro-resonators are composed of materials selected from the group consisting of silicon, germanium, silicon nitride, aluminum nitride, silicon dioxide, lithium niobate, diamond, and compound semiconductors.

20. The system of claim 12, wherein the curved waveguide is a pulley waveguide extending around a majority of the circumference of the first micro-resonator.

* * * * *